(12) United States Patent
Li et al.

(10) Patent No.: US 12,114,320 B2
(45) Date of Patent: Oct. 8, 2024

(54) DCI-BASED TONE RESERVATION FOR POWER CONTROL

(71) Applicant: QUALCOMM Incorporated, San Diego, CA (US)

(72) Inventors: Junyi Li, Fairless Hills, PA (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/377,153

(22) Filed: Jul. 15, 2021

(65) Prior Publication Data

US 2022/0022236 A1     Jan. 20, 2022

Related U.S. Application Data

(60) Provisional application No. 63/052,907, filed on Jul. 16, 2020.

(51) Int. Cl.
    *H04W 72/23*      (2023.01)
    *H04L 27/26*      (2006.01)
    (Continued)

(52) U.S. Cl.
    CPC ......... *H04W 72/23* (2023.01); *H04L 27/2614* (2013.01); *H04W 28/26* (2013.01); *H04W 52/365* (2013.01)

(58) Field of Classification Search
None
See application file for complete search history.

(56) References Cited

U.S. PATENT DOCUMENTS 8,442,148 B2    5/2013   Dorpinghaus et al.
2017/0230213 A1*   8/2017   Wang ................... H04L 27/18
(Continued)

FOREIGN PATENT DOCUMENTS

WO    WO-2017116114 A1 *   7/2017  .......... H04L 5/0007

OTHER PUBLICATIONS

MOTOROLA: "Tone Reservation for OFDMA PAPR Reduction," 3GPP Draft, 3GPP TSG RAN1#42bis, R1-051032 Tone Reservation, 3rd Generation Partnership Project (3GPP), Mobile Competence Centre, 650, Route Des Lucioles, F-06921, Sophia-Antipolis Cedex, France, vol. RAN WG1, No. San Diego, USA, Oct. 10, 2005-Oct. 14, 2005, Oct. 4, 2005, Oct. 4, 2005 (Oct. 4, 2005), XP050100654, 5 pages, [retrieved on Oct. 4, 2005] p. 1.

(Continued)

*Primary Examiner* — Yemane Mesfin
*Assistant Examiner* — Jeff Banthrongsack
(74) *Attorney, Agent, or Firm* — Holland & Hart LLP/QUALCOMM Incorporated

(57) ABSTRACT

Methods, systems, and devices for wireless communications are described. To reduce peak-to-average power ratio (PAPR) associated with transmissions in a wireless communications system, a user equipment (UE) may implement tone reservation techniques. The UE may receive downlink control information from a base station that indicates a set of allocated resources that the UE is to use for the tone reservation. The UE may identify a first set of tones of the set of allocated resources for transmitting a data signal and a second set of tones of the set of allocated resources for transmitting a peak-reduction signal that reduces the peak power of the data signal. The UE may transmit the data signal and the peak-reduction signal based on the received downlink control information.

46 Claims, 20 Drawing Sheets

(51) Int. Cl.
　　　*H04W 28/26*　　　(2009.01)
　　　*H04W 52/36*　　　(2009.01)

(56) References Cited

U.S. PATENT DOCUMENTS

2018/0131485 A1\*　5/2018　Wang .................. H04B 7/0632
2019/0215849 A1\*　7/2019　Ye ........................ H04L 5/0094

OTHER PUBLICATIONS

Partial International Search Report—PCT/US2021/041952—ISA/EPO—Nov. 5, 2021.
Tellado-Mourelo J., "Peak to Average Power Reduction for Multicarrier Modulation", A Dissertation Submitted to the Department of Electrical Engineering and the Committee on Graduate Studies of Stanford University in Partial Fulfillment of the Requirements for the Degree of Doctor of Philosophy, XX, XX, Sep. 1, 1999, (Sep. 1, 1999), 163 pages, XP001223601, p. 66, paragraph [04.2], p. 83, paragraph [04.6], p. 91, figure 3.18, paragraph [03.9], p. 66-p. 99, figure 4.1, p. 100-p. 122, figure 5.1.
Ghassemi A., et al., "PAPR Reduction in OFDM Based Cognitive Radio with Blockwise-Subcarrier Activation", Communications (ICC), 2012 IEEE International Conference on, IEEE, Jun. 10, 2012 (Jun. 10, 2012), pp. 5598-5602, XP032274486, DOI: 10.1109/ICC.2012.6364660 ISBN: 978-1-4577-2052-9 paragraph [0III].
International Search Report and Written Opinion—PCT/US2021/041952—ISA/EPO—Feb. 9, 2022.

\* cited by examiner

DCI-BASED TONE RESERVATION FOR POWER CONTROL

CROSS REFERENCE

The present Application for Patent claims the benefit of U.S. Provisional Patent Application No. 63/052,907 by LI et al., entitled "DCI-BASED TONE RESERVATION FOR POWER CONTROL," filed Jul. 16, 2020, assigned to the assignee hereof, and expressly incorporated by reference herein.

INTRODUCTION

The following relates to wireless communications, including managing tone reservation for power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a base station, downlink control information (DCI) indicating a set of allocated resources that the UE is to utilize for tone reservation, transmitting a data signal on a first set of tones from the set of allocated resources based on the DCI, and transmitting a peak-reduction signal on a second set of tones being different from the first set of tones.

An apparatus for wireless communications at a UE is described. The apparatus may include a processor and memory coupled with the processor. The processor and memory may be configured to receive, from a base station, DCI indicating a set of allocated resources that the UE is to utilize for tone reservation, transmit a data signal on a first set of tones from the set of allocated resources based on the DCI, and transmit a peak-reduction signal on a second set of tones being different from the first set of tones.

Another apparatus for wireless communications at a UE is described. The apparatus may include means for receiving, from a base station, DCI indicating a set of allocated resources that the UE is to utilize for tone reservation, means for transmitting a data signal on a first set of tones from the set of allocated resources based on the DCI, and means for transmitting a peak-reduction signal on a second set of tones being different from the first set of tones.

A non-transitory computer-readable medium storing code for wireless communications at a UE is described. The code may include instructions executable by a processor to receive, from a base station, DCI indicating a set of allocated resources that the UE is to utilize for tone reservation, transmit a data signal on a first set of tones from the set of allocated resources based on the DCI, and transmit a peak-reduction signal on a second set of tones being different from the first set of tones.

Some examples of the method, apparatuses, and non-transitory computer-readable medium described herein may further include operations, features, means, or instructions for determining the DCI includes a first DCI and a second DCI, the first DCI indicating the first set of tones and the second DCI indicating the second set of tones, receiving, in a first codeword, the first DCI associated with a first radio network temporary identifier (RNTI), and receiving, in a second codeword, the second DCI associated with a second RNTI, the first RNTI different from the second RNTI.

Some examples of the method, apparatuses, and non-transitory computer-readable medium described herein may further include operations, features, means, or instructions for determining the second RNTI indicates one or more resources from a set of allocated resources for transmission of the second set of tones and transmitting a peak-reduction signal on the second set of tones based on the second RNTI.

In some examples of the method, apparatuses, and non-transitory computer-readable medium described herein, the first codeword and the first RNTI being different from the second codeword and the second RNTI.

Some examples of the method, apparatuses, and non-transitory computer-readable medium described herein may further include operations, features, means, or instructions for receiving a message including a monitoring configuration for the first RNTI and the second RNTI and monitoring for the first RNTI or the second RNTI based on receiving the monitoring configuration.

In some examples of the method, apparatuses, and non-transitory computer-readable medium described herein, the monitoring configuration including a radio resource control (RRC) message, a remaining minimum system information (RMSI) message, or both.

Some examples of the method, apparatuses, and non-transitory computer-readable medium described herein may further include operations, features, means, or instructions for determining the DCI includes a first field and a second field, the first field indicating the first set of tones and the second field indicating the second set of tones and receiving, in a codeword, the first field and the second field.

Some examples of the method, apparatuses, and non-transitory computer-readable medium described herein may further include operations, features, means, or instructions for determining the peak-reduction signal may be configured to reduce a peak to average power ratio (PAPR) value associated with the uplink transmission, identifying a PAPR value that exceeds a threshold PAPR value for an uplink transmission, and receiving, in the DCI, an allocation of the first set of tones that may be within a threshold frequency distance from the second set of tones based on the identified PAPR value.

Some examples of the method, apparatuses, and non-transitory computer-readable medium described herein may further include operations, features, means, or instructions for transmitting, to the base station, a request for a number of tones to be allocated to the second set of tones for transmission of the peak-reduction signal in accordance with a reduced PAPR value and receiving the DCI based on the request.

In some examples of the method, apparatuses, and non-transitory computer-readable medium described herein, the request for the number of tones including at least portion of a power headroom report.

Some examples of the method, apparatuses, and non-transitory computer-readable medium described herein may further include operations, features, means, or instructions for determining that the second set of tones may be common to the UE and one or more other UEs, identifying a proximity relationship between the first set of tones and the second set of tones of the set of allocated resources, a tone reservation capability of the UE being based on the proximity relationship, and transmitting the data signal and the peak-reduction signal based on the proximity relationship.

Some examples of the method, apparatuses, and non-transitory computer-readable medium described herein may further include operations, features, means, or instructions for determining the proximity relationship may be associated with a difference in frequency between the first set of tones and the second set of tones.

Some examples of the method, apparatuses, and non-transitory computer-readable medium described herein may further include operations, features, means, or instructions for transmitting, to a base station, an indication of a tone reservation capability for an uplink transmission by the UE, determining the set of allocated resources may be scheduled by the DCI in accordance with the tone reservation capability of the UE, and configuring the peak-reduction signal based on the tone reservation capability.

In some examples of the method, apparatuses, and non-transitory computer-readable medium described herein, the tone reservation capability of the UE including a power amplification class, a number of antenna elements, a number of radio frequency chains, a number of multiple-input multiple-output layers, a maximum power reduction value, or any combination thereof.

Some examples of the method, apparatuses, and non-transitory computer-readable medium described herein may further include operations, features, means, or instructions for determining that the first set of tones for transmitting the data signal at the UE may be different from a third set of tones for transmitting a second data signal by a second UE, determining that the second set of tones for transmitting the peak-reduction signal at the UE at least partially overlap with a fourth set of tones for transmitting a second peak reduction-signal by the second UE, and transmitting the peak-reduction signal on the second set of tones based on a simultaneous transmission by the second UE.

Some examples of the method, apparatuses, and non-transitory computer-readable medium described herein may further include operations, features, means, or instructions for identifying a first RNTI associated the first set of tones for transmitting the data signal at the UE that may be different from a second RNTI associated with the third set of tones for transmitting the second data signal by the second UE, the first RNTI and the second RNTI being different from a third RNTI that may be common to the second set of tones and the fourth set of tones.

Some examples of the method, apparatuses, and non-transitory computer-readable medium described herein may further include operations, features, means, or instructions for determining the second set of tones for transmitting the peak-reduction signal at least partially overlap with the third set of tones for transmitting the second data signal, the fourth set of tones for transmitting the second peak-reduction signal, or both and transmitting the peak-reduction signal based on the overlap.

Some examples of the method, apparatuses, and non-transitory computer-readable medium described herein may further include operations, features, means, or instructions for transmitting the first set of tones on a first beam of the set of allocated resources and transmitting the second set of tones on a second beam of the set of allocated resources.

Some examples of the method, apparatuses, and non-transitory computer-readable medium described herein may further include operations, features, means, or instructions for determining that the DCI indicates whether the second set of tones may be allocated for transmission of the peak-reduction signal, identifying a number of the second set of tones based on a function of the set of allocated resources, and transmitting the peak-reduction signal on the second set of tones allocated by the DCI.

Some examples of the method, apparatuses, and non-transitory computer-readable medium described herein may further include operations, features, means, or instructions for refraining from monitoring an RNTI associated with the second set of tones based on a determination that the second set of tones may be not allocated for transmission of the peak-reduction signal.

In some examples of the method, apparatuses, and non-transitory computer-readable medium described herein, the function of the set of allocated resources including a fraction of the set of allocated resources, a fraction of a total number of tones, or both.

Some examples of the method, apparatuses, and non-transitory computer-readable medium described herein may further include operations, features, means, or instructions for receiving a control message that includes a configuration for the second set of tones.

A method for wireless communications at a base station is described. The method may include transmitting DCI indicating a set of allocated resources that a UE is to utilize for tone reservation, the set of allocated resources including a first set of tones for transmission of a data signal and a second set of tones for transmission of a peak-reduction signal, the second set of tones being different from the first set of tones and receiving, from the UE, the data signal on the first set of tones and the peak-reduction signal on the second set of tones based on the DCI.

An apparatus for wireless communications at a base station is described. The apparatus may include a processor and memory coupled with the processor. The processor and memory may be configured to transmit DCI indicating a set of allocated resources that a UE is to utilize for tone reservation, the set of allocated resources including a first set of tones for transmission of a data signal and a second set of tones for transmission of a peak-reduction signal, the second set of tones being different from the first set of tones and receive, from the UE, the data signal on the first set of tones and the peak-reduction signal on the second set of tones based on the DCI.

Another apparatus for wireless communications at a base station is described. The apparatus may include means for transmitting DCI indicating a set of allocated resources that a UE is to utilize for tone reservation, the set of allocated resources including a first set of tones for transmission of a data signal and a second set of tones for transmission of a peak-reduction signal, the second set of tones being different from the first set of tones and means for receiving, from the UE, the data signal on the first set of tones and the peak-reduction signal on the second set of tones based on the DCI.

A non-transitory computer-readable medium storing code for wireless communications at a base station is described. The code may include instructions executable by a processor to transmit DCI indicating a set of allocated resources that a UE is to utilize for tone reservation, the set of allocated resources including a first set of tones for transmission of a data signal and a second set of tones for transmission of a peak-reduction signal, the second set of tones being different from the first set of tones and receive, from the UE, the data signal on the first set of tones and the peak-reduction signal on the second set of tones based on the DCI.

Some examples of the method, apparatuses, and non-transitory computer-readable medium described herein may further include operations, features, means, or instructions for determining the DCI includes a first DCI and a second DCI, the first DCI indicating the first set of tones and the second DCI indicating the second set of tones, transmitting the first DCI in a first codeword associated with a first RNTI and transmitting the second DCI in a second codeword associated with a second RNTI, the first RNTI different from the second RNTI.

Some examples of the method, apparatuses, and non-transitory computer-readable medium described herein may further include operations, features, means, or instructions for determining the second RNTI indicates one or more resources from a set of allocated resources for transmission of the second set of tones and receiving a peak-reduction signal on the second set of tones based on the second RNTI.

In some examples of the method, apparatuses, and non-transitory computer-readable medium described herein, the first codeword and the first RNTI being different from the second codeword and the second RNTI.

Some examples of the method, apparatuses, and non-transitory computer-readable medium described herein may further include operations, features, means, or instructions for transmitting a message including a monitoring configuration for the first RNTI and the second RNTI and monitoring for the first RNTI or the second RNTI based on receiving the monitoring configuration.

Some examples of the method, apparatuses, and non-transitory computer-readable medium described herein may further include operations, features, means, or instructions for transmitting, in a codeword, the DCI including a first field and a second field, the first field indicating the first set of tones and the second field indicating the second set of tones.

A method of wireless communications at a UE is described. The method may include receiving, from a base station, DCI indicating a set of allocated resources that the UE is to utilize for tone reservation, identifying, from the set of allocated resources, a first set of tones for transmitting a data signal and a second set of tones for transmitting a peak-reduction signal, the first set of tones being different from the second set of tones, and transmitting the data signal on the first set of tones and the peak-reduction signal on the second set of tones based on the DCI.

An apparatus for wireless communications at a UE is described. The apparatus may include a processor and memory coupled with the processor. The processor and memory may be configured to receive, from a base station, DCI indicating a set of allocated resources that the UE is to utilize for tone reservation, identify, from the set of allocated resources, a first set of tones for transmitting a data signal and a second set of tones for transmitting a peak-reduction signal, the first set of tones being different from the second set of tones, and transmit the data signal on the first set of tones and the peak-reduction signal on the second set of tones based on the DCI.

Another apparatus for wireless communications at a UE is described. The apparatus may include means for receiving, from a base station, DCI indicating a set of allocated resources that the UE is to utilize for tone reservation, identifying, from the set of allocated resources, a first set of tones for transmitting a data signal and a second set of tones for transmitting a peak-reduction signal, the first set of tones being different from the second set of tones, and transmitting the data signal on the first set of tones and the peak-reduction signal on the second set of tones based on the DCI.

A non-transitory computer-readable medium storing code for wireless communications at a UE is described. The code may include instructions executable by a processor to receive, from a base station, DCI indicating a set of allocated resources that the UE is to utilize for tone reservation, identify, from the set of allocated resources, a first set of tones for transmitting a data signal and a second set of tones for transmitting a peak-reduction signal, the first set of tones being different from the second set of tones, and transmit the data signal on the first set of tones and the peak-reduction signal on the second set of tones based on the DCI.

Some examples of the method, apparatuses, and non-transitory computer-readable medium described herein may further include operations, features, means, or instructions for determining the DCI includes a first DCI and a second DCI, the first DCI indicating the first set of tones and the second DCI indicating the second set of tones, receiving, in a first codeword, the first DCI associated with a first RNTI and receiving, in a second codeword, the second DCI associated with a second RNTI, the first RNTI different from the second RNTI.

Some examples of the method, apparatuses, and non-transitory computer-readable medium described herein may further include operations, features, means, or instructions for determining the second RNTI indicates one or more resources from a set of allocated resources for transmission of the second set of tones, and transmitting a peak-reduction signal on the second set of tones based on the second RNTI.

In some examples of the method, apparatuses, and non-transitory computer-readable medium described herein, the first codeword and the first RNTI is different from the second codeword and the second RNTI.

Some examples of the method, apparatuses, and non-transitory computer-readable medium described herein may further include operations, features, means, or instructions for receiving a message including a monitoring configuration for the first RNTI and the second RNTI, and monitoring for the first RNTI or the second RNTI based on receiving the monitoring configuration.

In some examples of the method, apparatuses, and non-transitory computer-readable medium described herein, the monitoring configuration includes a radio resource control (RRC) message, a RMSI message, or both.

Some examples of the method, apparatuses, and non-transitory computer-readable medium described herein may further include operations, features, means, or instructions for determining the peak-reduction signal may be configured to reduce a PAPR value associated with the uplink transmission, identifying a PAPR value that exceeds a threshold PAPR value for an uplink transmission, and receiving, in the DCI, an allocation of the first set of tones that may be within a threshold frequency distance from the second set of tones based on the identified PAPR value.

Some examples of the method, apparatuses, and non-transitory computer-readable medium described herein may further include operations, features, means, or instructions for transmitting, to the base station, a request for a number of tones to be allocated to the second set of tones for transmission of the peak-reduction signal in accordance with a reduced PAPR value, and receiving the DCI based on the request.

Some examples of the method, apparatuses, and non-transitory computer-readable medium described herein may further include operations, features, means, or instructions for determining that the second set of tones may be common to the UE and one or more other UEs, identifying a proximity relationship between the first set of tones and the second set of tones of the set of allocated resources, a tone reservation capability of the UE being based on the proximity relationship, and transmitting the data signal and the peak-reduction signal based on the proximity relationship.

Some examples of the method, apparatuses, and non-transitory computer-readable medium described herein may further include operations, features, means, or instructions for determining the proximity relationship may be associated with a difference in frequency between the first set of tones and the second set of tones.

Some examples of the method, apparatuses, and non-transitory computer-readable medium described herein may further include operations, features, means, or instructions for transmitting, to a base station, an indication of a tone reservation capability for an uplink transmission by the UE, determining the set of allocated resources may be scheduled by the DCI in accordance with the tone reservation capability of the UE, and configuring the peak-reduction signal based on the tone reservation capability.

In some examples of the method, apparatuses, and non-transitory computer-readable medium described herein, the tone reservation capability of the UE includes a power amplification class, a number of antenna elements, a number of radio frequency chains, a number of multiple-input multiple-output layers, a maximum power reduction value, or any combination thereof.

Some examples of the method, apparatuses, and non-transitory computer-readable medium described herein may further include operations, features, means, or instructions for determining that the first set of tones for transmitting the data signal at the UE may be different from a third set of tones for transmitting a second data signal by a second UE, determining that the second set of tones for transmitting the peak-reduction signal at the UE at least partially overlap with a fourth set of tones for transmitting a second peak reduction-signal by the second UE, and transmitting the peak-reduction signal on the second set of tones based on a simultaneous transmission by the second UE.

Some examples of the method, apparatuses, and non-transitory computer-readable medium described herein may further include operations, features, means, or instructions for identifying a first RNTI associated the first set of tones for transmitting the data signal at the UE that may be different from a second RNTI associated with the third set of tones for transmitting the second data signal by the second UE, the first RNTI and the second RNTI being different from a third RNTI that may be common to the second set of tones and the fourth set of tones.

Some examples of the method, apparatuses, and non-transitory computer-readable medium described herein may further include operations, features, means, or instructions for determining the second set of tones for transmitting the peak-reduction signal at least partially overlap with the third set of tones for transmitting the second data signal, the fourth set of tones for transmitting the second peak-reduction signal, or both, and transmitting the peak-reduction signal based on the overlap.

Some examples of the method, apparatuses, and non-transitory computer-readable medium described herein may further include operations, features, means, or instructions for transmitting the first set of tones on a first beam of the set of allocated resources, and transmitting the second set of tones on a second beam of the set of allocated resources.

Some examples of the method, apparatuses, and non-transitory computer-readable medium described herein may further include operations, features, means, or instructions for determining that the DCI indicates whether the second set of tones may be allocated for transmission of the peak-reduction signal, identifying a number of the second set of tones based on a function of the set of allocated resources, and transmitting the peak-reduction signal on the second set of tones allocated by the DCI.

Some examples of the method, apparatuses, and non-transitory computer-readable medium described herein may further include operations, features, means, or instructions for refraining from monitoring an RNTI associated with the second set of tones based on a determination that the second set of tones may be not allocated for transmission of the peak-reduction signal.

In some examples of the method, apparatuses, and non-transitory computer-readable medium described herein the set of allocated resources may be a fraction of the set of allocated resources, a fraction of a total number of tones, or both.

Some examples of the method, apparatuses, and non-transitory computer-readable medium described herein may further include operations, features, means, or instructions for receiving a control message that includes a configuration for the second set of tones.

A method of wireless communications at a base station is described. The method may include determining a set of allocated resources that a UE is to utilize for tone reservation, the set of allocated resources including a first set of tones for transmission of a data signal and a second set of tones for transmission of a peak-reduction signal, the first set of tones being different from the second set of tones, transmitting DCI indicating the set of allocated resources, and receiving, from the UE, the data signal on the first set of tones and the peak-reduction signal on the second set of tones based on the DCI.

An apparatus for wireless communications at a base station is described. The apparatus may include a processor and memory coupled with the processor. The processor and memory may be configured to determine a set of allocated resources that a UE is to utilize for tone reservation, the set of allocated resources including a first set of tones for transmission of a data signal and a second set of tones for transmission of a peak-reduction signal, the first set of tones being different from the second set of tones, transmit DCI indicating the set of allocated resources, and receive, from the UE, the data signal on the first set of tones and the peak-reduction signal on the second set of tones based on the DCI.

Another apparatus for wireless communications at a base station is described. The apparatus may include means for determining a set of allocated resources that a UE is to utilize for tone reservation, the set of allocated resources including a first set of tones for transmission of a data signal and a second set of tones for transmission of a peak-reduction signal, the first set of tones being different from the second set of tones, transmitting DCI indicating the set of allocated resources, and receiving, from the UE, the data signal on the first set of tones and the peak-reduction signal on the second set of tones based on the DCI.

A non-transitory computer-readable medium storing code for wireless communications at a base station is described. The code may include instructions executable by a processor to determine a set of allocated resources that a UE is to utilize for tone reservation, the set of allocated resources including a first set of tones for transmission of a data signal and a second set of tones for transmission of a peak-reduction signal, the first set of tones being different from the second set of tones, transmit DCI indicating the set of allocated resources, and receive, from the UE, the data signal on the first set of tones and the peak-reduction signal on the second set of tones based on the DCI.

Some examples of the method, apparatuses, and non-transitory computer-readable medium described herein may further include operations, features, means, or instructions for determining the DCI includes a first DCI and a second DCI, the first DCI indicating the first set of tones and the second DCI indicating the second set of tones, transmitting the first DCI in a first codeword associated with a first RNTI, and transmitting the second DCI in a second codeword associated with a second RNTI, the first RNTI different from the second RNTI.

Some examples of the method, apparatuses, and non-transitory computer-readable medium described herein may further include operations, features, means, or instructions for determining the second RNTI indicates one or more resources from a set of allocated resources for transmission of the second set of tones, and receiving a peak-reduction signal on the second set of tones based on the second RNTI.

Some examples of the method, apparatuses, and non-transitory computer-readable medium described herein may further include operations, features, means, or instructions for transmitting a message including a monitoring configuration for the first RNTI and the second RNTI, and monitoring for the first RNTI or the second RNTI based on receiving the monitoring configuration.

Some examples of the method, apparatuses, and non-transitory computer-readable medium described herein may further include operations, features, means, or instructions for determining the peak-reduction signal may be configured to reduce a PAPR value associated with the uplink transmission, identifying a PAPR value for the UE that exceeds a threshold PAPR value for an uplink transmission, allocating the first set of tones to be within a threshold frequency distance from the second set of tones based on the identified PAPR value, and transmitting the DCI with the allocation of the first set of tones and the second set of tones.

Some examples of the method, apparatuses, and non-transitory computer-readable medium described herein may further include operations, features, means, or instructions for receiving, from the UE, a request for a number of tones to be allocated to the second set of tones for transmission of the peak-reduction signal in accordance with a reduced PAPR value, and transmitting the DCI based on the request.

Some examples of the method, apparatuses, and non-transitory computer-readable medium described herein may further include operations, features, means, or instructions for determining that the second set of tones may be common to the UE and one or more other UEs, identifying a proximity relationship between the first set of tones and the second set of tones of the set of allocated resources, a tone reservation capability of the UE being based on the proximity relationship, and receiving the data signal and the peak-reduction signal based on the proximity relationship.

Some examples of the method, apparatuses, and non-transitory computer-readable medium described herein may further include operations, features, means, or instructions for determining the proximity relationship may be associated with a difference in frequency between the first set of tones and the second set of tones.

Some examples of the method, apparatuses, and non-transitory computer-readable medium described herein may further include operations, features, means, or instructions for receiving, from the UE, an indication of a tone reservation capability for an uplink transmission by the UE, determining the configuration of the DCI based on the tone reservation capability of the UE, and receiving the peak-reduction signal based on the tone reservation capability.

Some examples of the method, apparatuses, and non-transitory computer-readable medium described herein may further include operations, features, means, or instructions for determining that the first set of tones for transmission of the data signal from the UE may be different from a third set of tones for transmission of a second data signal from a second UE, determining that the second set of tones for transmission of the peak-reduction signal at the UE at least partially overlap with a fourth set of tones for transmission of a second peak reduction-signal by the second UE, and receiving the peak-reduction signal on the second set of tones based on a simultaneous transmission by the first UE and the second UE.

Some examples of the method, apparatuses, and non-transitory computer-readable medium described herein may further include operations, features, means, or instructions for identifying a first RNTI associated the first set of tones for transmitting the data signal at the UE that may be different from a second RNTI associated with the third set of tones for transmitting the second data signal by the second UE, the first RNTI and the second RNTI being different from a third RNTI that may be common to the second set of tones and the fourth set of tones.

Some examples of the method, apparatuses, and non-transitory computer-readable medium described herein may further include operations, features, means, or instructions for determining the second set of tones for transmission of the peak-reduction signal at least partially overlap with the third set of tones for transmission of the second data signal, the fourth set of tones for transmission of the second peak-reduction signal, or both, and receiving the peak-reduction signal based on the overlap.

Some examples of the method, apparatuses, and non-transitory computer-readable medium described herein may further include operations, features, means, or instructions for receiving the first set of tones on a first beam of the set of allocated resources, and receiving the second set of tones on a second beam of the set of allocated resources.

Some examples of the method, apparatuses, and non-transitory computer-readable medium described herein may further include operations, features, means, or instructions for identifying a number of the second set of tones to allocate for transmission of the peak-reduction signal based on a function of the set of allocated resources, transmitting the DCI to allocate the second set of tones for transmission of the peak-reduction signal, and receiving the peak-reduction signal on the second set of tones allocated by the DCI.

Some examples of the method, apparatuses, and non-transitory computer-readable medium described herein may further include operations, features, means, or instructions for transmitting, to the UE, an indication that the second set of tones may be not allocated for transmission of the peak-reduction signal, and determining that the UE may be to refrain from monitoring an RNTI associated with the second set of tones based on the indication that the second set of tones may be not allocated.

Some examples of the method, apparatuses, and non-transitory computer-readable medium described herein may further include operations, features, means, or instructions for transmitting a control message that includes a configuration for the second set of tones.

DETAILED DESCRIPTION

Figure 1:
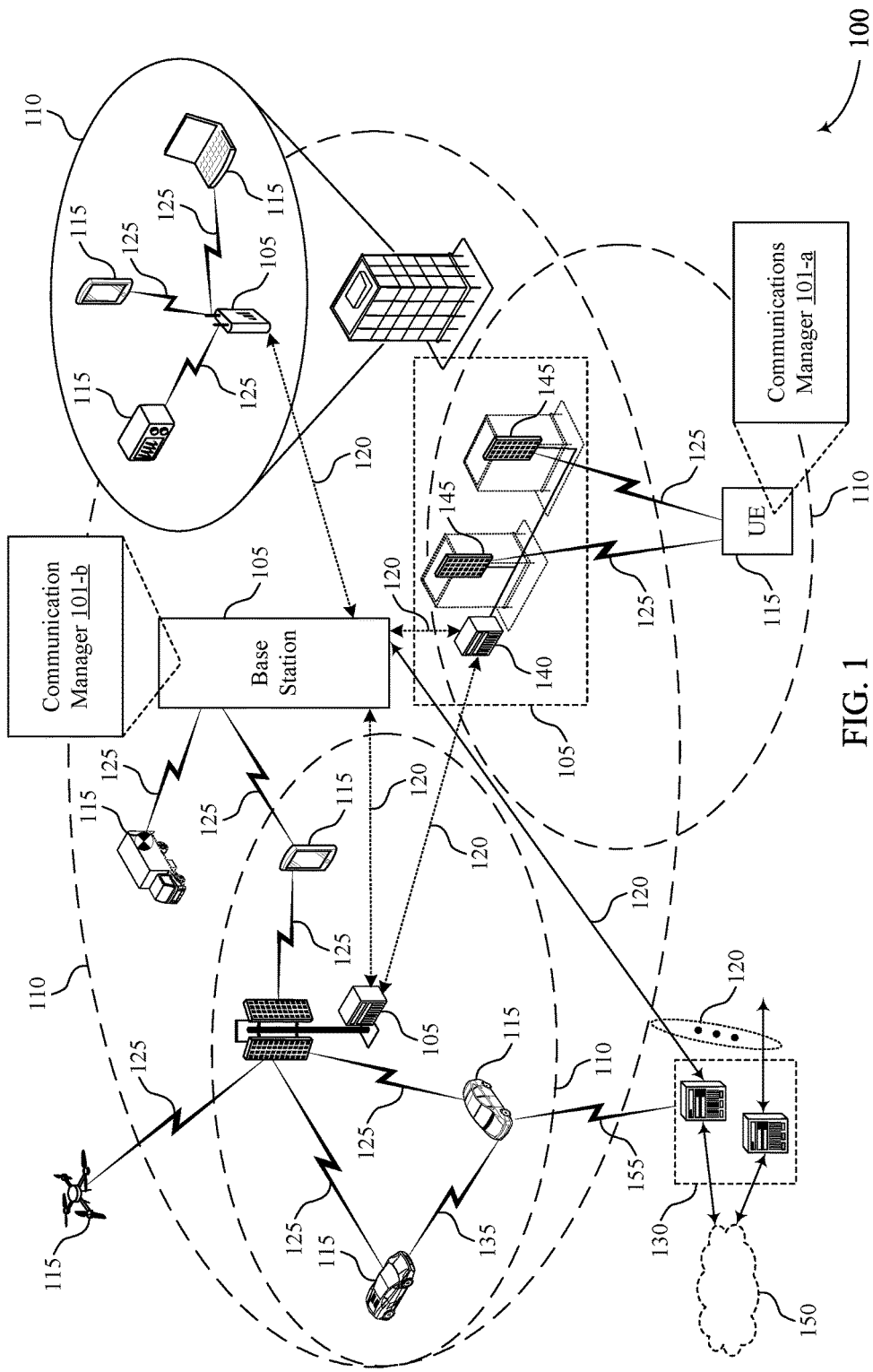
FIGS. 1 and 2 illustrate examples of wireless communications systems that support DCI-based tone reservation for power control in accordance with one or more aspects of the present disclosure.

A wireless communications system may support OFDM signaling which may in some cases be associated with high peak to average power ratio (PAPR) based on a number of independently modulated subcarriers used for transmissions between devices in the system. In some examples, a non-linear power amplified (PA) signal transmitted by a device such as a UE may have a signal power that varies with time such that the peak power value of a sample in a given OFDM transmit symbol for the signal is greater than the average power value of the signal. In such cases in which PAPR is greater than the average power value of the signal, the UE might "clip" the peak such that the device may measure an incorrect value or partial value for the peak (e.g., a set of values having the largest power measurements of the signal within a time interval). The clipping may in some cases cause signal distortions (e.g., signal compression, altered signal form, intermodulation distortion) that may impact the reliability of transmissions in the system.

To reduce signaling distortions and increase overall communications quality and efficiency, a wireless communications system may implement a number of techniques to reduce PAPR to a threshold level below which signal distortions occur less frequently than before applying the techniques. One such technique may include tone reservation, which may implement spare tones (e.g., subcarriers used for non-data transmissions) that may be used to transmit a peak-canceling signal to reduce the peak power of a data signal and lower the overall PAPR of the signal.

In some cases, however, the PAPR value associated with a UE and the amount of PAPR reduction for the UE may vary based on one or more factors such as the physical distance the UE is located from the base station, power overhead of the UE for transmitting data signals, and other factors. In such cases, the base station may dynamically allocate tones to the UE using control signaling such as DCI and based on the amount of PAPR reduction identified for the UE. For example, the base station may allocate a number of tones for a number of UEs in the wireless communication system, and may signal an indication of the number of tones allocated for the UEs using DCI. In one example, a total number of tones (e.g., OFDM symbols) may be allocated for use by each UE in the system, with a subset of the total number of tones allocated for each UE to transmit a data transmission, and another subset of tones allocated for each UE to transmit the peak-cancellation signal. In such examples, the tones used for the peak-cancellation signal may be pooled (e.g., grouped) or combined such that tones for the peak-cancellation signal may be identified as a common resource for the UEs. In addition, the DCI may indicate a scheduling for transmission of the spare tones in cases where tones used for data transmissions and peak-cancellation at least partially overlap between transmitting UEs.

In such cases, the location of the tones used for peak cancellation with respect to the location of the tones used for transmission of data may affect the amount of PAPR reduction observed by the UE. For example, a larger PAPR reduction may be associated with the set of tones for data transmissions and the set of tones for peak-cancellation transmissions being close together in frequency (e.g., the tones may be close in frequency as determined by a "closeness function" that captures contiguity and distance between allocated data tones and spare tones). The base station may determine sets of tones to allocate to certain UEs based on amounts of PAPR reduction requested by UEs, or based on how large a value of PAPR is for a UE. For example, the base station may determine UE has high PAPR (e.g., with respect to other UEs in the system) and may allocate tones that are close together (e.g., tones that are located within a threshold distance from one another in frequency) for the UE to use for transmitting data and peak reduction signals. The base station may allocate the tones via an indication in the DCI.

In some other examples, the base station may use DCI to dynamically allocate tones to the UE based on a spatial location of the UE, or other factors that may affect PAPR at the UE in order to reduce the power consumption of the UE and to increase power savings. In some other examples, the number of tones that the UE may transmit may vary based on the amount of data the UE has to send or other capabilities of the UE. Additionally, the set of spare tones may be statically allocated as a fixed number by the base station, or may be determined by a ratio or fractional value of the total number of tones.

In some other examples, the DCI may indicate whether spare tones are allocated for the UE. For example, there may be indicator associated with the DCI (e.g., a one or two bit indication) that allocates a percentage of an uplink transmission (e.g., a percentage of a physical uplink shared channel (PUSCH) transmission) that may be used for the spare tones and for the transmission of the peak-cancellation signal.

In some cases, the UE may monitor for an indication of tone reservation and for the allocation of the peak-cancellation tones based on a specific radio network temporary identifier (RNTI) that may be included in the DCI. for example, the base station may send an indication that the UE is to monitor for the specific RNTI in addition to a different UE-specific RNTI. The specific RNTI may indicate a number of resource blocks that may be used for transmitting the spare tones.

Using dynamic allocation of tone reservation resources using DCI, the wireless communications system may reduce PAPR for transmissions between devices in the network, which may save power and increase battery life for the devices, as well as increase overall communications efficiency in the system.

Aspects of the disclosure are initially described in the context of wireless communications systems and examples of DCI-based tone reservation techniques for power control and PAPR reduction. One or more aspects of the disclosure are further illustrated by and described with reference to apparatus diagrams, system diagrams, process flow diagrams, and flowcharts that relate to DCI-based tone reservation for power control.

FIG. 1 illustrates an example of a wireless communications system 100 that supports DCI-based tone reservation for power control in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or other commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UE 115 may include a communications manager 101-*a* configured to support various aspects of sidelink power headroom reporting as described herein. Additionally, the base station 105 may include a communications manager 101-*b*. For example, the communications manager 101-*a* may be configured to transmit DCI, and the communications manager 101-*a* may be configured to receive the DCI that indicates the allocated resources the UE 115 is to use for tone reservation. The communications managers 101-*a* and 101-*b* may be further configured to identify a first set of tones for transmitting a data signal and a second set of tones for transmitting a peak reduction signal. The communications manager 101-*a* may be further configured to support transmitting the data signal on the first set of tones and the peak reduction signal on the second set of tones based on the received DCI. The communications manager 101-*b* may be configured to receive the data signal on the first set of tones and the peak reduction signal on the second set of tones.

A wireless communications system may support OFDM signaling which may in some cases be associated with high PAPR for transmissions between devices in the system. In some examples, a signal transmitted by a device such as a UE 115 may have a peak power that is greater than the average power value of the signal. In such cases in which PAPR is high (e.g., relative to an average power value), the UE 115 may measure an incorrect value or partial value of the peak, causing signal distortions that impact the reliability of transmissions in the system. To reduce signaling distortions and increase overall communications quality and efficiency, a wireless communications system may implement a number of techniques to reduce PAPR. One such technique may include tone reservation, which may include use of spare tones (e.g., subcarriers used for non-data transmissions) that may be used to transmit a peak-cancelling signal to reduce the peak power of a data signal and lower the overall PAPR of the signal.

A base station 105 may allocate a number of tones for a number of UEs 115 in the wireless communication system, and may signal the number of tones allocated for the UEs 115 using DCI. In one example, a total number of tones may be allocated for each UE 115 in the system, with a subset of the total number of tones allocated for each UE 115 to transmit a data transmission, and another subset of tones may be allocated for each UE to transmit the peak-cancellation signal. In such cases, the location of the tones used for peak cancellation with respect to the tones used for transmission of data may affect the amount of PAPR reduction observed by the UE 115. For example, a larger PAPR reduction may be associated with examples where the set of tones for data transmissions and the set of tones for peak-cancellation transmissions are close together in frequency. The base station 105 may determine sets of tones to allocate to certain UEs 115 based on amounts of PAPR reduction requested by UEs 115, or based on how large a value of PAPR is for a UE 115. The base station 105 may allocate the tones via an indication in the DCI.

In some other examples, the base station may use DCI to dynamically allocate tones to the UE 115 based on a spatial location of the UE 115, or other factors that may affect PAPR at the UE in order to reduce the power consumption of the UE 115 and increase power savings. In some other examples, the number of tones that the UE 115 may transmit may vary based on the amount of data the UE 115 has to send, capabilities of the UE 115, etc. Additionally, the set of spare tones may be statically allocated as a fixed number by the base station, or may be determined by a ratio or fractional value of the total number of tones. In addition, the spare tones may be signaled to the UE 115 using a specific RNTI that the UE 115 may use to monitor for the DCI for the allocation of the spare tones.

Figure 2:
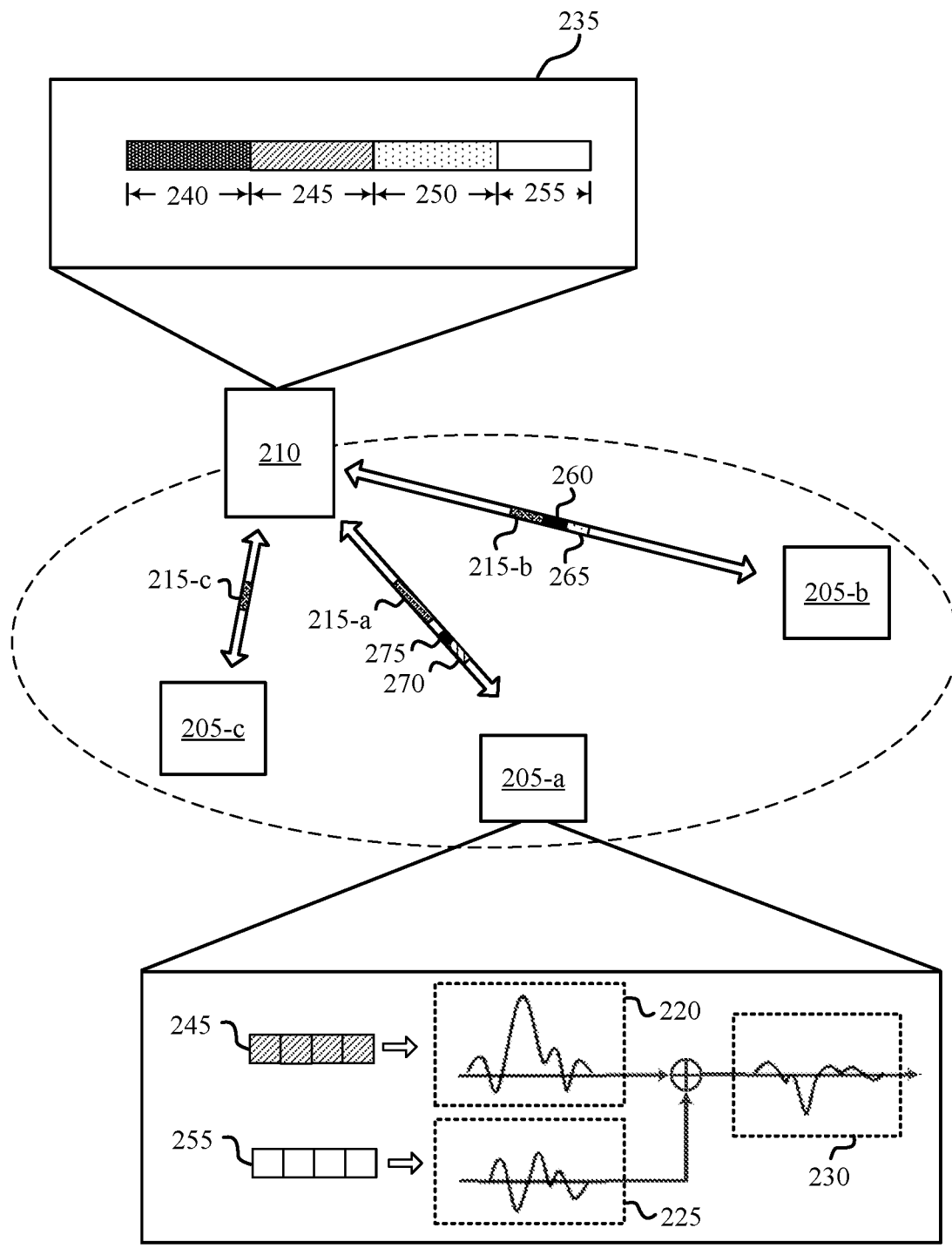

FIG. 2 illustrates an example of a wireless communications system 200 that supports DCI-based tone reservation for power control in accordance with one or more aspects of the present disclosure. In some examples, wireless communications system 200 may implement aspects of wireless communication system 100. The wireless communications system 200 may support various examples of DCI-based tone reservation techniques implemented at UEs 205-*a*, 205-*b*, and 205-*c*, and a base station 210, which may be examples of a UE 115 and a base station 105, respectively, as described with reference to FIG. 1. Although the example of wireless communications system 200 illustrates three UEs 205, the techniques described herein may be applicable to any quantity of UEs 205 and a base station 210.

Wireless communications system 200 may support OFDM signaling using a number of independently modulated subcarriers, which in some cases may result in PAPR for transmissions between devices in the system that satisfies a threshold level. In some examples, a non-linear power amplified (PA) signal transmitted by a device such as UE 205-*a*, UE 205-*b*, or UE 205-*c* may have a signal power that varies with time such that the peak power value of a sample in a given OFDM transmit symbol for the signal is greater than the average power value of the signal. In cases in which PAPR satisfies a threshold level, a UE 205 may "clip" the peak (e.g., the device may measure an incorrect value or partial value of the peak), causing signal distortions such as out of line emission, distorted signal to interference ratio, and other signaling effects that impact the reliability of transmissions in the system.

To reduce signaling distortions and increase overall communications quality and efficiency, wireless communications system 200 may implement a number of techniques to reduce PAPR for signals transmitted between the UEs 205 and base station 210. One such technique may include tone reservation, which may identify a number of unused or spare tones 255 (e.g., subcarriers used for non-data transmissions) that may be used to transmit a peak-cancellation signal 225 that lowers the PAPR of the time domain data signal 220. The transmission of both the data signal 220 and the peak-cancellation signal 225 on different sets of tones (e.g., OFDM tones 235) may reduce the peak signal such that the signal may be received as signal 230 with reduced PAPR.

In some examples, base station 210 may allocate a number of tones (e.g., 100 tones) for the transmission of OFDM signals from the UEs 205, and each of the tones may be modulated according to a modulation scheme such as QPSK, BPSK, 16-QAM, or any other modulation scheme. In some examples, the UEs 205 may determine to use a subset of the total number of tones (e.g., 90 tones) for a data transmission of an OFDM data signal 220, and the UEs 205 may use a remaining subset of the total tones (e.g., 10 tones) for transmission of the peak-cancellation signal 225, which may cancel or reduce the peak of the data signal 220 transmitted using the first set of tones. The UE 205 may transmit the total number of tones, including the data signal and the peak-cancelling signal, reducing the peak of the data signal and the associated PAPR.

In some cases, however, the PAPR value associated with a UE 205 and the amount of PAPR reduction for the UE 205 may vary based on a number of different factors such as physical distance from the base station 210, power overhead, etc. In such cases, a base station 210 may dynamically allocate tones to the UE 205 using DCI based on the amount of PAPR reduction determined for the UE 205. For example, the base station 210 may allocate a number of tones for a number of UEs (e.g., UE 205-*a*, UE 205-*b*, and UE 205-*c*) in the wireless communication system, and may signal the number of tones allocated for the UEs 205 using DCIs 215, or a first field 260 and second field 265 within a DCI 215. In one example, a total number of tones (e.g., 100 tones) may be allocated for each UE 205 in the system, with a subset 245 of the total number of tones (e.g., 90 tones) allocated for each UE 205 to transmit a data transmission, and another subset of tones (e.g., 10 tones) allocated for each UE 205 to transmit the peak-cancellation signal or other non-data transmissions. In such examples, the tones used for the peak-cancellation signal may be pooled (e.g., grouped) or combined such that tones for the peak-cancellation signal may be identified as a common resource for the UEs 205. In some examples, the DCI 215 may include an indication of a set of resources or a set of tones (e.g., 240 through 255) that a UE 205 may use for tone reservation.

In some cases, the location of the tones used for peak cancellation with respect to the tones used for transmission of data may affect the amount of PAPR reduction observed by the UE 205. For example, a PAPR reduction may be associated with examples where the set of tones for data transmissions and the set of tones for peak-cancellation transmissions are close in frequency (e.g., the tones may be close in frequency as determined by a "closeness function" that captures contiguity and distance between allocated data tones and spare tones).

The base station 210 may determine sets of tones to allocate to some UEs based on amounts of PAPR reduction requested by UEs, or based on how the value of PAPR is for a UE 205 (e.g., whether the PAPR is greater to or less than an average PAPR). For example, the base station 210 may determine UE 205-*b* has PAPR that satisfies a threshold level (e.g., with respect to UE 205-*a* and UE 205-*c*) and may allocate tones 250 for data transmission for the UE 205-*b*, which are close in frequency to the tones 255 used for transmission of the peak-cancelling signal. The base station 210 may allocate the tones for the UE 205-*b* via an indication in the DCI 215-*b*. Similarly, the base station 210 may determine that UE 205-*c* has a PAPR that fails to satisfy the threshold level, and may allocate tones 240 to the UE 205-*c* for data transmission, which are further away in frequency to the tones 255 used for transmission of the peak-cancelling signal. The base station 210 may allocate the tones for the UE 205-*c* via an indication in the DCI 215-*c*. In addition, the base station 210 may determine that the UE 205-*a* has a PAPR value that is in between the PAPR values determined for UE 205-*b* and UE 205-*c*. The base station may allocate tones 245 for transmission of the data signal and tones 255 for transmission of the peak-cancellation signal, and may allocate the tones for UE 205-*a* using DCI 215-*a*.

In some other examples, the base station 210 may dynamically allocate tones to UEs 205 based on a spatial location of the UEs 205, or other factors that may affect PAPR at the UE 205. For example, the PAPR reduction for each UE 205 may be determined by the base station 210 based on the distance the UE 205 is from the base station 210. For example, in some cases where a UE 205 is spatially far away from the base station 210 (e.g., UE 205-*b*), the UE 205 may have large PAPR (and reduced power headroom to transmit a peak signal) and high power consumption. In other cases, a UE 205 may be spatially close to the base station 210 (e.g., UE 205-*c*) and may have a small PAPR (and increased power headroom to transmit a peak signal). The base station 210 may determine to assign data tones 250 that are close to the spare tones 255 for the UE 205-*b* with large PAPR to more effectively reduce the PAPR for the UE 205-*b*. Additionally or alternatively, the base station 210 may assign additional spare tones for the UE 205-*b* that is far away to more greatly reduce PAPR. This allocation by the base station 210 may reduce the power consumption of the UE 205 and increase power savings. Conversely, the base station 210 may determine to assign data tones 240 that are further away from the spare tones 255 for the UE 205-*c* with small PAPR.

The base station 210 may have dynamic control of which UEs in the system may be allocated tones that are closer in frequency, and which UEs may receive a greater PAPR reduction. In some examples, the base station 210 may adjust the number of spare tones allocated to the UEs for peak-cancellation. For example, the base station 210 may determine that there is a number of UEs in the system that are far away (e.g., farther than a threshold distance from the base station 210), or consuming large amounts of power (e.g., consuming greater than a threshold amount of power), so the base station 210 may determine to allocate a greater number of tones for PAPR reduction and peak-cancellation to those UEs. In some other cases, the base station 210 may allocate fewer tones when UEs are close by (e.g., closer than a threshold distance) or consuming a smaller amounts of power (e.g., consuming less than a threshold amount of power).

The base station 210 may transmit DCI 215 to indicate the set of tones to UEs 205. The DCI 215 may indicate a first set of tones that a UE 205 may use to transmit the data signal 220 and a second set of tones that the UE 205 may use to transmit a peak-cancellation signal 225 to reduce PAPR of the transmission 230. For example, UE 205-*c* may receive DCI 215-*c* that indicates tones 240 for the transmission of data and tones 255 for transmission of the peak-cancellation signal. UE 205-*b* may receive DCI 215-*b* that indicates tones 250 for the transmission of data and tones 255 for transmission of the peak-cancellation signal. UE 205-*a* may receive DCI 215-*a* that indicates tones 245 for the transmission of data and tones 255 for transmission of the peak-cancellation signal. In some examples, the DCI 215-*a*, 215-*b*, and 215-*c* may be common to a number of UEs 205 scheduled to transmit in a given time period. In one example, a number of UEs 205 (e.g., 3 UEs) may be scheduled by the base station using a number of physical downlink control channels (PDCCHs) (e.g., 3 PDCCHs) that may schedule the tones used for each UE 205 for transmitting data. In some other examples, the DCI may include one or more fields which may indicate different sets of tones to be used by a UE 205. To schedule the set of spare tones that each UE 205 may use for transmitting the peak-cancellation signal 225, the base station may transmit the DCI 215 in an additional PDCCH (e.g., a 4th PDCCH). Based on the received DCI, the UEs 205 may determine a scheduled PUSCH may be used for the peak-cancellation waveform or for other non-data transmissions.

In some other examples, the number of tones that the UEs 205 may transmit may vary based on the amount of data the UEs 205 are to send, capabilities of the UEs 205, etc. Additionally, the set of spare tones may be statically allocated as a fixed number by the base station 210, or may be determined by a ratio or fractional value of the total number of tones. Additionally or alternatively, the number of spare tones that the UEs 205 use for peak cancellation may be identified by broadcast system information (e.g., RMSI), or via RRC signaling.

In some implementations, the set of spare tones 255 may be allocated to a UE 205 based on UE capability or status. For example, one or more UEs 205 may transmit a request 270 to the base station 210 (e.g., via RRC) that indicates various UE capabilities or a number of tones that the UE 205 may use for the peak cancellation. This way, the base station 210 may allocate tones that are closer together for a UE 205 that has a larger PAPR cancellation. For example, UE 205-b may transmit a request to the base station 210 that indicates a high PAPR, and the base station 210 may allocate tones 250 and 255 for the transmission of data and peak cancellation signals from the UE 205-b. The base station 210 may allocate spare tones dynamically for the group of UEs 205-a, 205-b and 205-c, or for each individual UE 205. In some other examples, the request 270 may include a power headroom report 275.

The base station 210 may further identify UEs 205 with a greater amount of PAPR, and may schedule the data transmission and peak-cancellation transmissions based on different UE capabilities (e.g., PA class, number of antenna elements, number of radio frequency (RF) chains, a number of MIMO layers, MPR, etc.). In some other cases, a UE 205 may request a number of spare tones in an RRC capability message. For example, a UE 205 may indicate a number of a spare tones as a function of a power head room report (PHR) transmitted by the UE 205. In some cases where a UE 205 has a large amount of power headroom (such as UE 205-c), the UE 205 may request a small number of spare tones. Conversely, if the UE 205 has a small amount of power headroom (such as UE 205-b), the UE 205 may request a larger number of spare tones.

In some cases, the DCI 215 may indicate a specific RNTI that indicates the allocated set of spare tones to the UEs at a given time. The base station 210 may send a message (e.g., via RRC or RMSI) that the UEs 205 are to monitor for the specific RNTI in addition to a different UE-specific RNTI. The specific RNTI may indicate, to the UEs 205, a number of resource blocks or a set of allocated resources that may be used for transmitting the spare tones. In some examples, the specific RNTI that indicates the allocated set of spare tones 255 may be common to other UEs of the wireless communications system 200 that are scheduled at the same time. For example, a first RNTI (e.g., RNTI 1) may be used to allocate a data transmission of a first UE (such as UE 205-a), a second RNTI (e.g., RNTI 2) may be used to allocate a data transmission of a second UE (such as UE 205-b), and a common RNTI (e.g., RNTI_0) may be is used to allocate the spare tone set 255 used for transmitting the peak reduction signal for both the first UE and the second UE.

In some cases, the tones that a first UE uses for transmitting data may be used by a second UE for transmitting the peak-cancellation waveform (e.g., if two UEs are associated with different transmissions from the base station, the set of spare tones of the first UE may overlap with the set of data tones allocated to the second UE). In some other cases, the sets of spare tones 255 associated with UEs that transmit simultaneously (e.g., during at least partially overlapping time durations) may overlap fully or partially, or may be identical. In such cases, the base station 210 may indicate the sets of tones in the DCI 215.

In some examples, the DCI 215 may indicate an allocation of a first tone set for a first UE that may include a first number of tones (e.g., tones 1 to 10) for transmission of data on a PUSCH, and the second tone set allocated for the first UE may include a second number of tones (e.g., tones 11 to 20) for the transmission of the peak-reduction signal. Additionally or alternatively, the DCI 215 may indicate a first tone set allocated for a second UE may include a third number of tones (e.g., tones 21 to 30) for the transmission of data on a PUSCH and a second tone set allocated for the second UE includes the second number of tones (e.g., tones 11 to 20) for transmission of a peak-reduction signal. In such examples, the first tone set used to transmit PUSCH for the first UE and the second UE are separate, and the peak-reduction tone sets at least partially overlap.

In some other examples, the base station 210 may receive uplink signals from the first UE and the second UE from separate angles of arrival. The base station 210 may transmit DCI 215 to allocate a first tone set allocated for the first UE may include a first number of tones (e.g., tones 1 to 10) for transmission of data on a PUSCH, and the second tone set allocated for the first UE includes a second number of tones (e.g., tones 11 to 30) for transmission of a peak-reduction signal. Additionally or alternatively, DCI 215 may allocate the first tone set for the second UE that may include a first number of tones (e.g., tones 21 to 30) for transmission of data on the PUSCH, and the second tone set allocated to the second UE includes a second number of tones (e.g., tones 11 to 20) for transmission of a peak-reduction signal. In such examples, the first tone set allocated to the second UE (e.g., for transmitting data) and the second tone set of the first UE (e.g., for transmitting the peak-reduction signal) may overlap. Because of spatial separation between tone sets, the peak-reduction signal from the first UE may remain separate from the data signal of the second UE.

In some other cases, the DCI 215 transmitted by the base station 210 may indicate whether spare tones 255 are allocated for one or more UEs 205. For example, there may be indicator associated with the DCI (e.g., a one or two bit indication) that allocates a percentage of an uplink transmission (e.g., a percentage of a PUSCH transmission) may be used for the spare tones and transmission of the peak-cancellation signal. In such examples, the spare tones 255 may be determined by UEs 205 as a function of an allocated resource block, as a function of the bandwidth part associated with the UEs 205, etc. For example, the UEs 205 may be configured to use a percentage of the allocated data transmission (e.g., 10% of a PUSCH allocation, 10% highest tones, etc.) for the spare tones 255.

Additionally or alternatively, a percentage of tones of a bandwidth part may be dedicated for spare tones 255. In some cases, a method and various parameters used to specify the allocation of the spare tones 255 may be conveyed by the base station using DCI, in a MAC-CE, via RRC signaling, etc. In addition, the indication of the spare tones may contain different "levels" such that a first level may be associated with a first percentage of spare tone allocation (e.g., 10% spare tone allocation), a second level may be associated with a second percentage of spare tone allocation (e.g., 20% spare tone allocation), among other percentage allocations. In some other cases, the UE 205 may determine that the second set of tones are not allocated for transmission of the peak-cancellation signal 225, and the UE 205 may refrain from monitoring the second RNTI used to indicate the spare tones 255.

Figure 3:
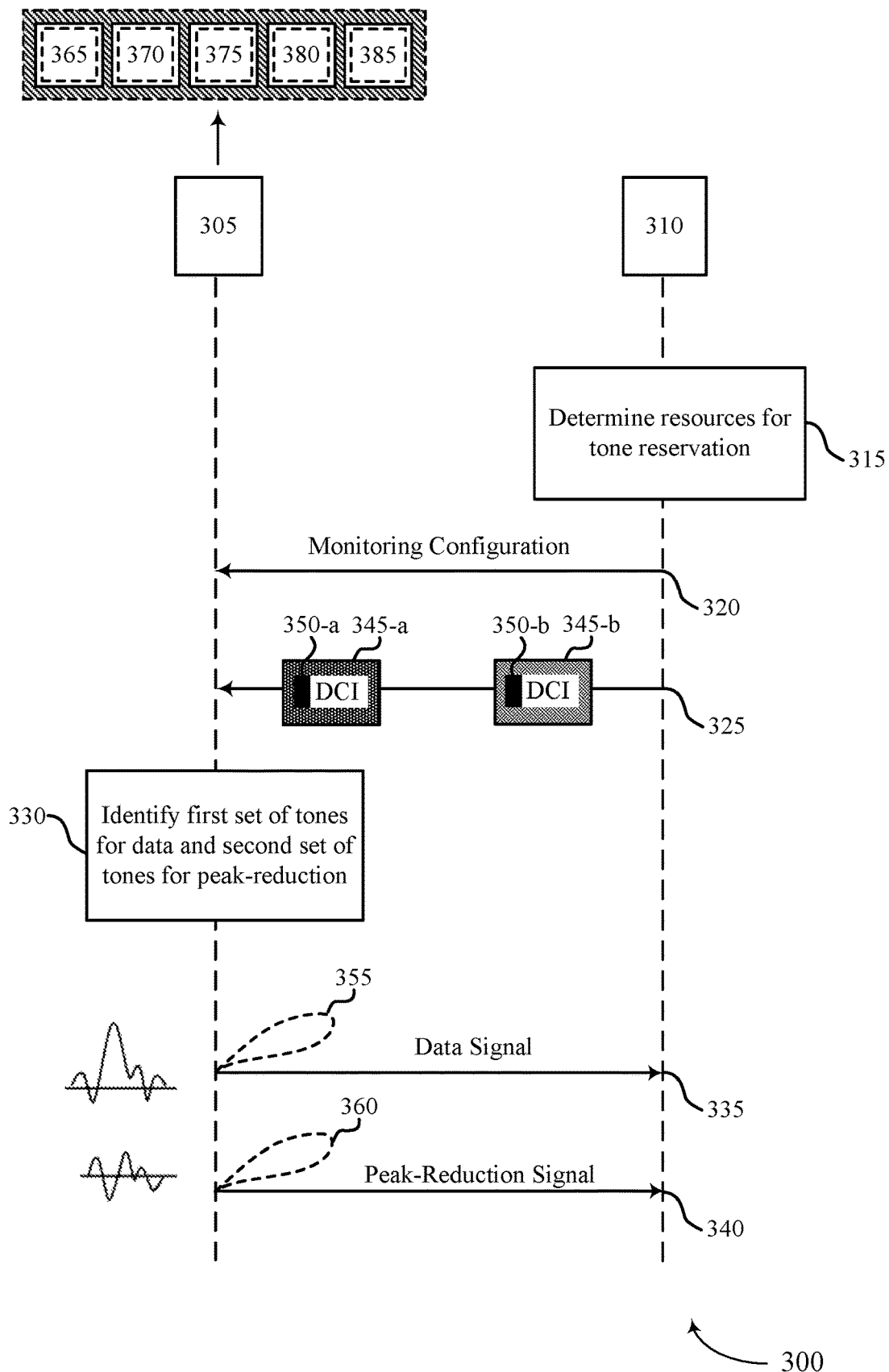
FIG. 3 illustrates an example of a process flow that supports DCI-based tone reservation for power control in accordance with one or more aspects of the present disclosure.

FIG. 3 illustrates an example of a process flow 300 that supports DCI-based tone reservation for power control in accordance with one or more aspects of the present disclosure. In some examples, process flow 300 may implement aspects of wireless communication system 100. The process flow 300 may support various examples of DCI-based tone reservation for power control between a UE 305 and a base station 310. The UE 305 and the base station 310 may be examples of the respective devices described with reference to FIGS. 1 and 2.

At 315, the base station 310 may determine a set of allocated resources that the UE 305 may use for tone reservation. The set of allocated resources may include one or more allocated resources. For example, the set of allocated resources may include a first set of tones for transmitting a data signal, and a second set of tones for transmitting a peak-reduction signal. In some examples, the first set of tones for transmitting the data may be different from the second set of tones for transmitting the peak-reduction signal.

At 320, the base station 310 may transmit, to UE 305 or a group of UEs, a monitoring configuration for the UE 305. The monitoring configuration may be signaled using an RRC message, an RMSI message, or both. In such cases, the UE 305 may monitor for a first RNTI 350-*a* or a second RNTI 350-*b* based on the monitoring configuration. In some cases, the UE 305 may refrain from monitoring for the second RNTI 350-*b* in cases where it does not receive the monitoring configuration, or in cases where the UE 305 determines that the set of spare tones are not allocated for transmission of the peak cancellation signal.

At 325, the base station 310 may transmit, to UE 305 or a group of UEs, the DCI indicating the set of allocated resources. The UE 305 may receive the set of allocated resources to be used for tone reservation. In some examples, the DCI may include a first DCI and a second DCI, where the first DCI indicates the first set of tones for transmitting the data signal and the second DCI indicates the second set of tones for transmitting the peak-reduction signal. The UE 305 may receive the first DCI in a first codeword 345-*a* in accordance with a first RNTI 350-*a*. In addition, the UE 305 may receive the second DCI in a second codeword 345-*b* in accordance with a second RNTI 350-*b*. The first codeword 345-*a* and the second codeword 345-*b* may be different codewords. In some cases, the UE 305 may receive a single DCI in a codeword which includes a first field and a second field, the first field indicating a first set of tones and the second field indicating a second set of tones.

The UE 305 may determine that the second RNTI 350-*b* indicates one or more resources from the set of resources that the UE 305 may use to transmit the second set of tones with the peak-reduction signal. The UE 305 in some cases may receive an additional message from the base station 310 that includes At 330, the UE may identify, from the set of allocated resources, that the first set of tones may be used for transmitting the data signal and the second set of tones for transmitting the peak-reduction signal, the first set of tones being different from the second set of tones.

The UE 305 may determine that the peak-reduction signal reduces PAPR associated with the uplink transmission. The UE 305 may identify a PAPR value that exceeds a threshold PAPR value for an uplink transmission, and may receive, in the DCI, an allocation of the first set of tones that is within a threshold frequency distance from the second set of tones based at least in part on the identified PAPR value. In some examples, the UE 305 may optionally transmit a request for a number of tones to be allocated to the second set of tones for transmission of the peak reduction signal in order to achieve a reduced PAPR (or to reduce PAPR by a threshold amount). The base station 310 may format DCI based on the request received by the UE 305. In some cases, the UE 305 may transmit the request as a power headroom report (e.g., a separate power headroom report), or the request may be included in an existing power headroom report.

In some examples, the UE 305 may transmit an indication of a tone reservation capability for an uplink transmission by the UE 305, and may receive scheduling by the DCI in accordance with the tone reservation capability. The UE 305 may configure the peak-reduction signal based at least in part on the tone reservation capability. The tone reservation capability of the UE 305 may be associated at least in part with a power amplification class 365, a number of antenna elements 370, a number of radio frequency chains 375, a number of multiple-input multiple-output layers 380, a maximum power reduction value 385, or any combination thereof.

In some examples, the base station 310 may allocate resources as common resources to the UE 305. For example, the UE 305 may determine that the allocated resources are common to one or more other UEs of the system. The UE may identify a proximity relationship (e.g., using a "closeness" function) between the first set of tones and the second set of tones of the allocated resources. For example, the proximity relationship may be associated with a difference in frequency between the first set of tones and the second set of tones. In some other examples, the proximity relationship may be a function of spacing between tones, symbol timing in the wireless communications system, among a number of other factors. In some aspects, the tone reservation capabilities of the UE 305 may be based on the proximity relationship between the first set of tones and the second set of tones (e.g., the UE 305 may have greater PAPR reduction capabilities for tones that are in close proximity). The UE determine to transmit the data signal 335 and the peak reduction signal 340 based on the proximity relationship.

In some cases, process flow 300 may describe a multi-UE communications system. For example, the base station 310 may communicate with UE 305 and at least one other UE. The UE 305 may determine that the first set of tones for transmitting the data signal 335 at the UE 305 is different from a third set of tones for transmitting a second data signal by a second UE. The UE 305 may determine that the second set of tones for transmitting the peak-reduction signal 340 at the UE 305 at least partially overlap with a fourth set of tones for transmitting a second peak reduction-signal by the second UE. At 335 and 340, the UE 305 may transmit the data transmission on the first set of tones and the peak-reduction signal on the second set of tones based at least in part on a simultaneous (e.g., overlapping) transmission by the second UE and a received DCI that schedules the transmission.

The UE 305 may identify a first RNTI associated the first set of tones for transmitting the data signal at the UE that is different from a second RNTI associated with the third set of tones for transmitting the second data signal by the second UE (e.g., two different RNTIs may be used to indicate the data transmissions for the UE 305 and the second UE). The first RNTI and the second RNTI used to schedule the data transmissions may be different from a third RNTI that is common to the second set of tones and the fourth set of tones for transmitting the peak-cancellation signals at both the UE 305 and the second UE.

In some examples, the UE 305 may determine the second set of tones for transmitting the peak-reduction signal 340 at least partially overlap with the third set of tones for transmitting the second data signal 335, the fourth set of tones for transmitting the second peak-reduction signal, or both, and the UE 305-a may transmit the peak-reduction signal based at least in part on the overlap, where the peak-reduction signal is scheduled by the DCI. In some cases, the UE 305 may transmit the data signal 335 on a first beam 355 of the set of allocated resources, and may transit the peak-reduction signal 340 on a second beam 360 of the set of allocated resources.

In some other cases, the UE 305 may determine that the DCI indicates whether the second set of tones are allocated for transmission of the peak-reduction signal 340. The UE 305 may identify a number of the second set of tones based on a function of the set of allocated resources (e.g., the number of the second set of tones may be a fraction of the total number of tones, a fraction of the set of allocated resources or a portion of a bandwidth part of the UE, or both). The UE 305 may transmit the peak-reduction signal 340 on the second set of tones allocated by the DCI.

Based on the various techniques described herein, the UE 305 may transmit the data signal on the first set of tones at 335 and the peak-reduction signal on the second set of tones at 340 based at least in part on the DCI transmitted by the base station 310.

Figure 4:
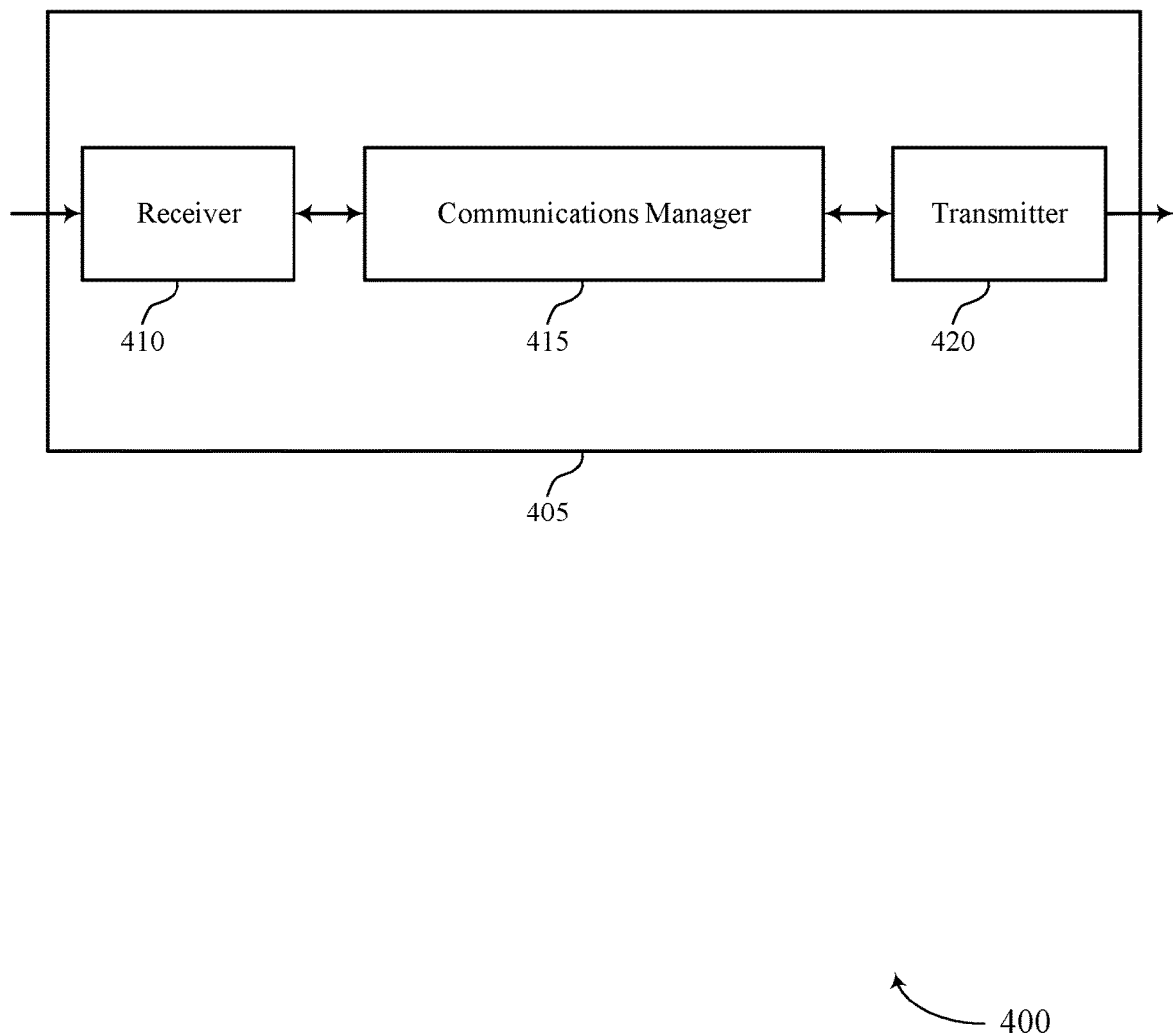
FIGS. 4 and 5 show block diagrams of devices that support DCI-based tone reservation for power control in accordance with one or more aspects of the present disclosure.

FIG. 4 shows a block diagram 400 of a device 405 that supports DCI-based tone reservation for power control in accordance with one or more aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may provide a means for receiving information such as packets, user data, or control information associated with various information channels (e.g., control channels, data channels, and information related to DCI-based tone reservation for power control, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may be an example of means for performing various aspects of DCI-based tone reservation for power control as described herein. The communication manager 415, or its sub-components, may be implemented in hardware (e.g., in communications management circuitry), code (e.g., as communications management software or firmware) executed by a processor, or any combination thereof. If implemented in code executed by a processor, the functions of the communication manager 415, or its sub-components may be executed by a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described in the present disclosure. In some examples, the communication manager 415 may be configured to perform various operations (e.g., receiving, monitoring, transmitting) using or otherwise in cooperation with the receiver 410, the transmitter 420, or both.

The communications manager 415 may support wireless communication in accordance with examples as disclosed herein. For example, the communication manager 415 may be configured to provide or support a means for receiving, from a base station, DCI indicating a set of allocated resources that the UE is to utilize for tone reservation. The communications manager 415 may also be configured to support means for identifying, from the set of allocated resources, a first set of tones for transmitting a data signal and a second set of tones for transmitting a peak-reduction signal, the first set of tones being different from the second set of tones. The communications manager may be further configured to support a means for transmitting the data signal on the first set of tones and the peak-reduction signal on the second set of tones based on the DCI. The communications manager 415 may be an example of aspects of the communications manager 710 described herein.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may provide a means for transmitting signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, communications manager 415 may be implemented as an integrated circuit or chipset for a mobile device modem, and the receiver 410 and transmitter 420 may be implemented as analog components (e.g., amplifiers, filters, antennas, etc.) coupled with the mobile device modem to enable wireless transmission and reception.

The communications manager 415 as described herein may be implemented to realize one or more potential advantages. Various implementations may enable the reduction of PAPR and the dynamic allocation of spare tones for the UE to utilize in tone reservation techniques. At least one implementation may enable the communications manager 415 to effectively allocate or identify tones to a single UE or a group of UEs in the network. In addition, communications manager 415 may be able to effectively determine different sets of tones which may yield PAPR reduction for the devices in the system.

Based on implementing the DCI-based tone reservation techniques as described herein, one or more processors of the device 405 (e.g., processor(s) controlling or incorporated with one or more of receiver 410, communications manager 415, and transmitter 420) may reduce the total transmit power and PAPR associated with transmissions between devices in the wireless network, which may increase power savings and battery life. In addition, the tone reservation techniques may allow for dynamic allocation of tones by the base station on a group or individual UE level.

Figure 5:
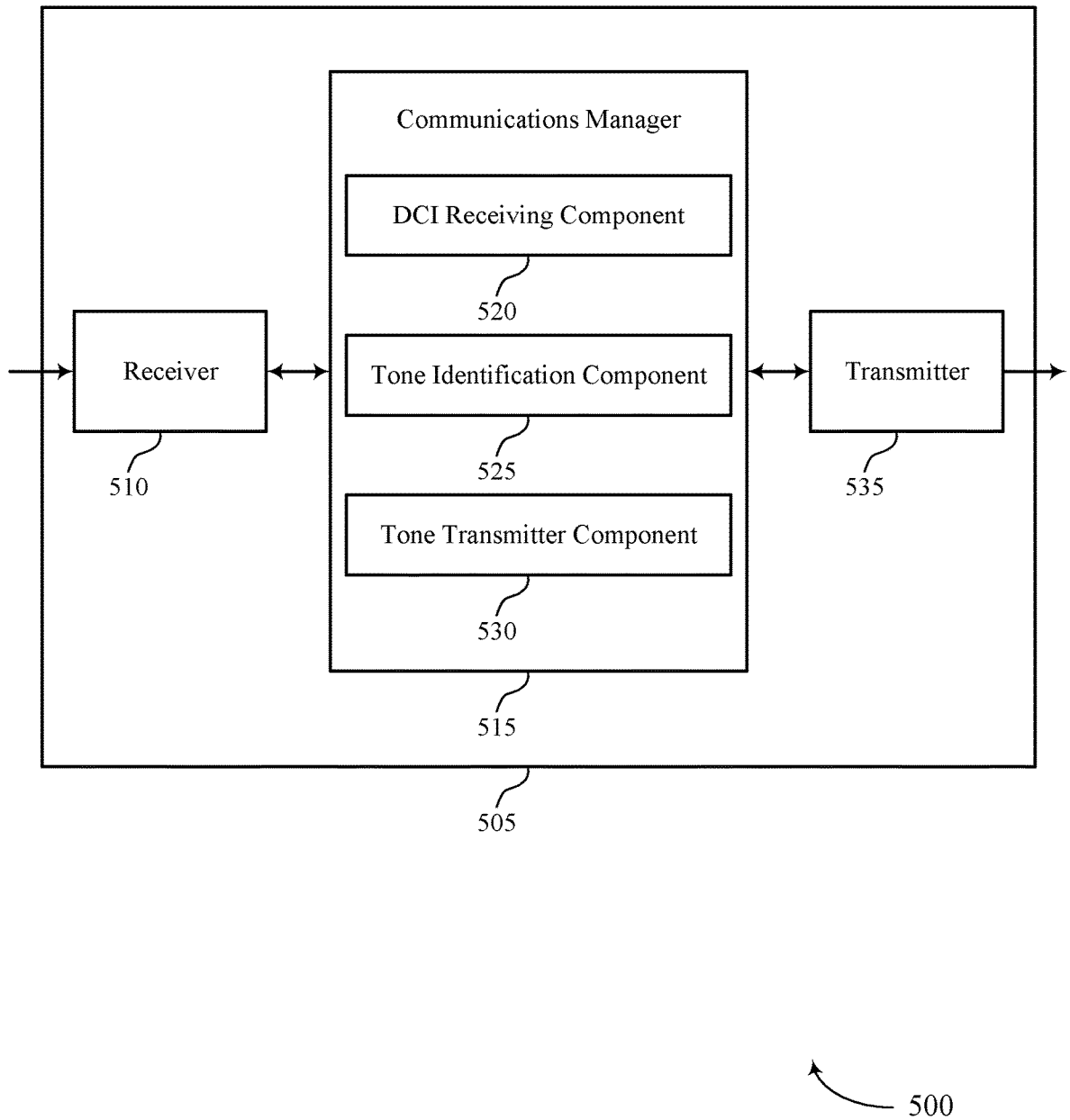

FIG. 5 shows a block diagram 500 of a device 505 that supports DCI-based tone reservation for power control in accordance with one or more aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may provide means for receiving information such as packets, user data, or control information associated with various information channels (e.g., control channels, data channels, and information related to DCI-based tone reservation for power control, etc.). Information may be passed on to other components of the device 505. The receiver 510 may utilize a single antenna or a set of antennas.

The communications manager 515 may be an example of aspects of the communications manager 415 as described herein, and may be an example of means for performing various aspects of DCI-based tone reservation for power control as described herein. The communications manager 515 may include a DCI receiving component 520, a tone identification component 525, and a tone transmitter component 530. The communications manager 515 may be an example of aspects of the communications manager 710 described herein. In some examples, the communication manager 515 may be configured to perform various operations (e.g., receiving, monitoring, transmitting) using or otherwise in cooperation with one or both of the receiver 510 or the transmitter 420 as described herein.

The DCI receiving component 520 may provide a means for receiving, from a base station, DCI indicating a set of allocated resources that the UE is to utilize for tone reservation.

The tone identification component 525 may provide a means for identifying, from the set of allocated resources, a first set of tones for transmitting a data signal and a second set of tones for transmitting a peak-reduction signal, the first set of tones being different from the second set of tones.

The tone transmitter component 530 may provide a means for transmitting the data signal on the first set of tones and the peak-reduction signal on the second set of tones based on the DCI.

The transmitter 535 may further provide a means for transmitting signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
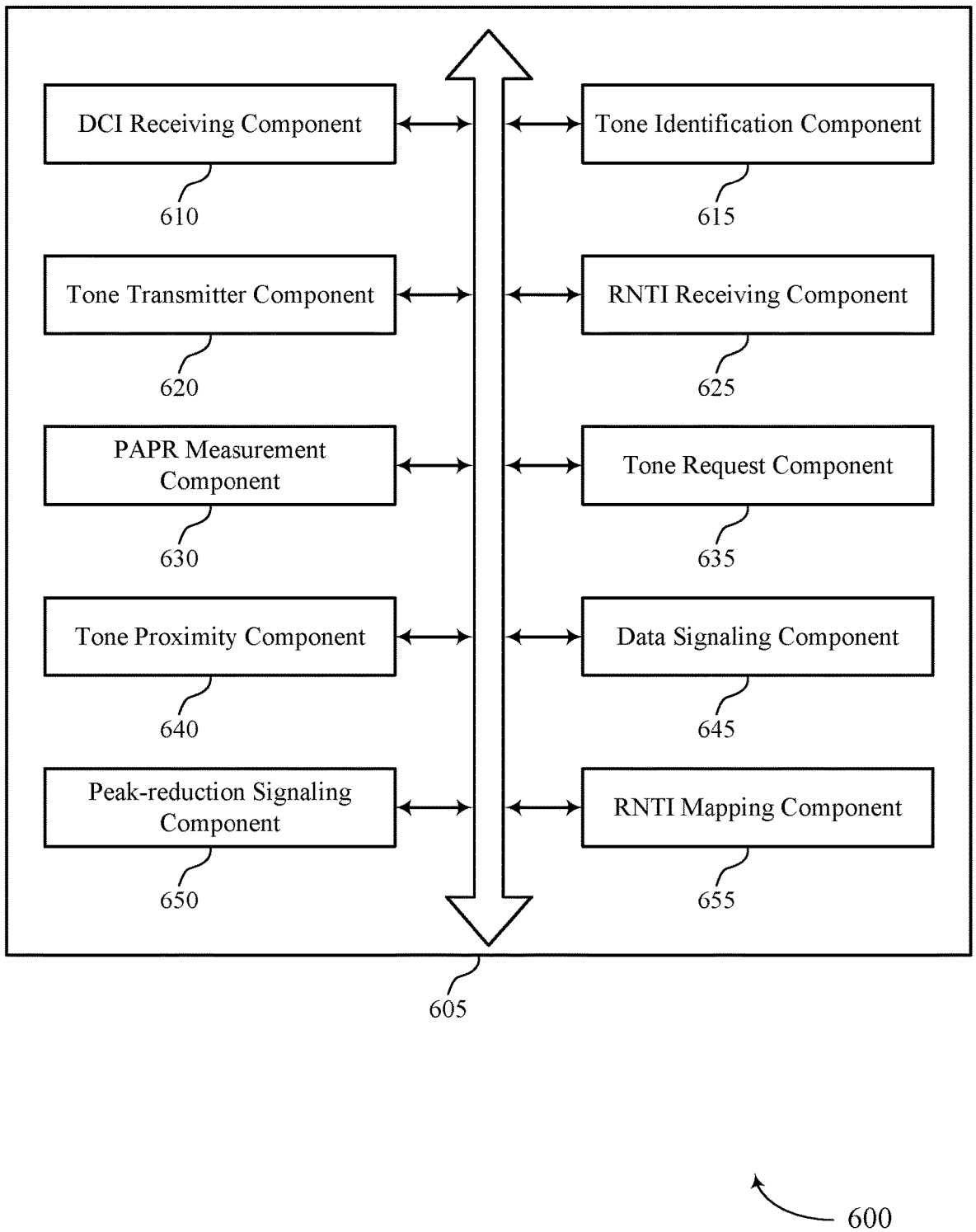
FIG. 6 shows a block diagram of a communications manager that supports DCI-based tone reservation for power control in accordance with one or more aspects of the present disclosure.

FIG. 6 shows a block diagram 600 of a communications manager 605 that supports DCI-based tone reservation for power control in accordance with one or more aspects of the present disclosure. The communications manager 605 may be an example of aspects of a communications manager 415, a communications manager 515, or a communications manager 710, or both described herein. The communications manager 415 or the communications manager 515, or various components thereof, may be an example of means for performing various aspects of DCI-based tone reservation for power control as described herein. For example, the communications manager 605 may include a DCI receiving component 610, a tone identification component 615, a tone transmitter component 620, a RNTI receiving component 625, a PAPR measurement component 630, a tone request component 635, a tone proximity component 640, a data signaling component 645, a peak-reduction signaling component 650, and a RNTI mapping component 655. Each of these modules may communicate, directly or indirectly, with one another (e.g., via one or more buses).

The DCI receiving component 610 may provide or support a means for receiving, from a base station, DCI indicating a set of allocated resources that the UE may utilize for tone reservation. In some examples, determining the DCI includes a first DCI and a second DCI, the first DCI indicating the first set of tones and the second DCI indicating the second set of tones.

The PAPR measurement component 630 may provide or support a means for determining the peak-reduction signal reduces a PAPR value associated with the uplink transmission. In some examples, the PAPR measurement component 630 may provide or support a means for identifying a PAPR value that exceeds a threshold PAPR value for an uplink transmission. In some examples, the DCI receiving component 610 may provide or support a means for receiving, in the DCI, an allocation of the first set of tones that is within a threshold frequency distance from the second set of tones based on the identified PAPR value.

The tone request component 635 may provide or support a means for transmitting, to the base station, a request for a number of tones to be allocated to the second set of tones for transmission of the peak-reduction signal in accordance with a reduced PAPR value. In some examples, the tone request component 635 may provide or support a means for transmitting, to a base station, an indication of a tone reservation capability for an uplink transmission by the UE. In some examples, the tone request component 635 may provide or support a means for determining the set of allocated resources is scheduled by the DCI in accordance with the tone reservation capability of the UE. In some examples, the DCI receiving component 610 may provide or support a means for receiving the DCI based on the request.

The tone identification component 615 may provide or support a means for identifying, from the set of allocated resources, a first set of tones for transmitting a data signal and a second set of tones for transmitting a peak-reduction signal, the first set of tones being different from the second set of tones. In some examples, receiving a control message that includes a configuration for the second set of tones.

In some examples, the tone identification component 615 may provide or support a means for determining that the second set of tones is common to the UE and one or more other UEs. In some examples, the tone identification component 615 may provide or support a means for determining the proximity relationship is associated with a difference in frequency between the first set of tones and the second set of tones.

The tone proximity component 640 may provide or support a means for identifying a proximity relationship between the first set of tones and the second set of tones of the set of allocated resources, a tone reservation capability of the UE being based on the proximity relationship. The data signaling component 645 may provide or support a means for transmitting the data signal and the peak-reduction signal based on the proximity relationship. In some examples, the data signaling component 645 may provide or support a means for transmitting the first set of tones on a first beam of the set of allocated resources.

In some examples, the tone identification component 615 may provide or support a means for determining that the first set of tones for transmitting the data signal at the UE is different from a third set of tones for transmitting a second data signal by a second UE. In some examples, the tone identification component 615 may provide or support a means for determining that the second set of tones for transmitting the peak-reduction signal at the UE at least partially overlap with a fourth set of tones for transmitting a second peak reduction-signal by the second UE.

In some examples, the tone identification component 615 may provide or support a means for determining the second set of tones for transmitting the peak-reduction signal at least partially overlap with the third set of tones for transmitting the second data signal, the fourth set of tones for transmitting the second peak-reduction signal, or both. In some examples, the peak-reduction signaling component 650 may provide or support a means for transmitting the peak-reduction signal based on the overlap.

In some examples, the tone identification component 615 may determine that the DCI indicates whether the second set of tones are allocated for transmission of the peak-reduction signal. In some examples, the tone identification component 615 may provide or support a means for identifying a number of the second set of tones based on a function of the set of allocated resources.

The RNTI receiving component 625 may provide or support a means for receiving, in a first codeword, the first DCI associated with a first RNTI. In some examples, the RNTI receiving component 625 may provide or support a means for receiving, in a second codeword, the second DCI associated with a second RNTI, the first RNTI different from the second RNTI. In some examples, the RNTI receiving component 625 may provide or support a means for determining the second RNTI indicates one or more resources from a set of allocated resources for transmission of the second set of tones.

The RNTI mapping component 655 may provide or support a means for identifying a first RNTI associated the first set of tones for transmitting the data signal at the UE that is different from a second RNTI associated with the third set of tones for transmitting the second data signal by the second UE, the first RNTI and the second RNTI being different from a third RNTI that is common to the second set of tones and the fourth set of tones.

In some examples, the RNTI receiving component 625 may provide or support a means for receiving a message including a monitoring configuration for the first RNTI and the second RNTI. In some examples, the RNTI receiving component 625 may provide or support a means for monitoring for the first RNTI or the second RNTI based on receiving the monitoring configuration.

The tone transmitter component 620 may provide or support a means for transmitting the data signal on the first set of tones and the peak-reduction signal on the second set of tones based on the DCI. In some examples, the tone transmitter component 620 may provide or support a means for transmitting a peak-reduction signal on the second set of tones based on the second RNTI.

The peak-reduction signaling component 650 may provide or support a means for configuring the peak-reduction signal based on the tone reservation capability. In some examples, the peak-reduction signaling component 650 may provide or support a means for transmitting the peak-reduction signal on the second set of tones based on a simultaneous transmission by the second UE. In some examples, the peak-reduction signaling component 650 may provide or support a means for transmitting the second set of tones on a second beam of the set of allocated resources.

In some examples, the peak-reduction signaling component 650 may provide or support a means for transmitting the peak-reduction signal on the second set of tones allocated by the DCI. In some examples, the peak-reduction signaling component 650 may provide or support a means for refraining from monitoring an RNTI associated with the second set of tones based on a determination that the second set of tones are not allocated for transmission of the peak reduction signal.

Figure 7:
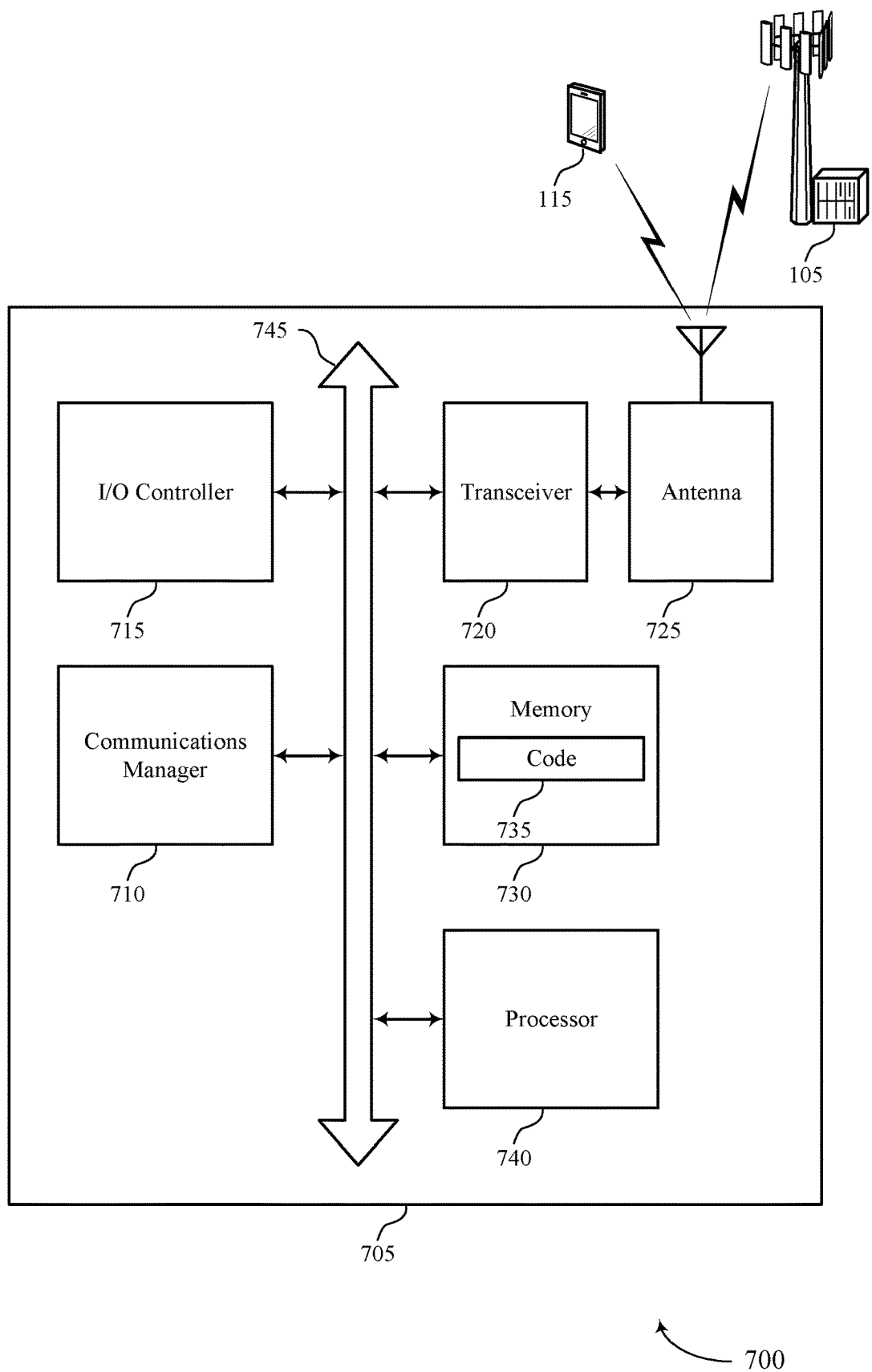
FIG. 7 shows a diagram of a system including a device that supports DCI-based tone reservation for power control in accordance with one or more aspects of the present disclosure.

FIG. 7 shows a diagram of a system 700 including a device 705 that supports DCI-based tone reservation for power control in accordance with one or more aspects of the present disclosure. The device 705 may be an example of or include the components of device 405, device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communication manager 710, or various components thereof, may be an example of means for performing various aspects of DCI-based tone reservation for power control as described herein. For example, The communications manager 710 may receive, from a base station, DCI indicating a set of allocated resources that the UE is to utilize for tone reservation, identify, from the set of allocated resources, a first set of tones for transmitting a data signal and a second set of tones for transmitting a peak-reduction signal, the first set of tones being different from the second set of tones, and transmit the data signal on the first set of tones and the peak-reduction signal on the second set of tones based on the DCI.

In some examples, the communication manager 710 may be configured to perform various operations (e.g., receiving, monitoring, transmitting) using or otherwise in cooperation with one or both of the transceiver 720 or the one or more antennas 725. Although the communication manager 710 is illustrated as a separate component, in some examples, one or more functions described with reference to the communication manager 710 may be supported by or performed by the processor 735, the memory 730, the code 735, or any combination thereof. For example, the code 735 may include instructions executable by the processor 735 to cause the device 705 to perform various aspects of DCI-based tone reservation for power control as described herein, or the processor 735 and the memory 730 may be otherwise configured to perform or support such operations.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

In some cases, the wireless device may include a single antenna 725. However, in some cases the device may have more than one antenna 725, which may be capable of concurrently transmitting or receiving multiple wireless transmissions.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the one or more antennas.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting DCI-based tone reservation for power control).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
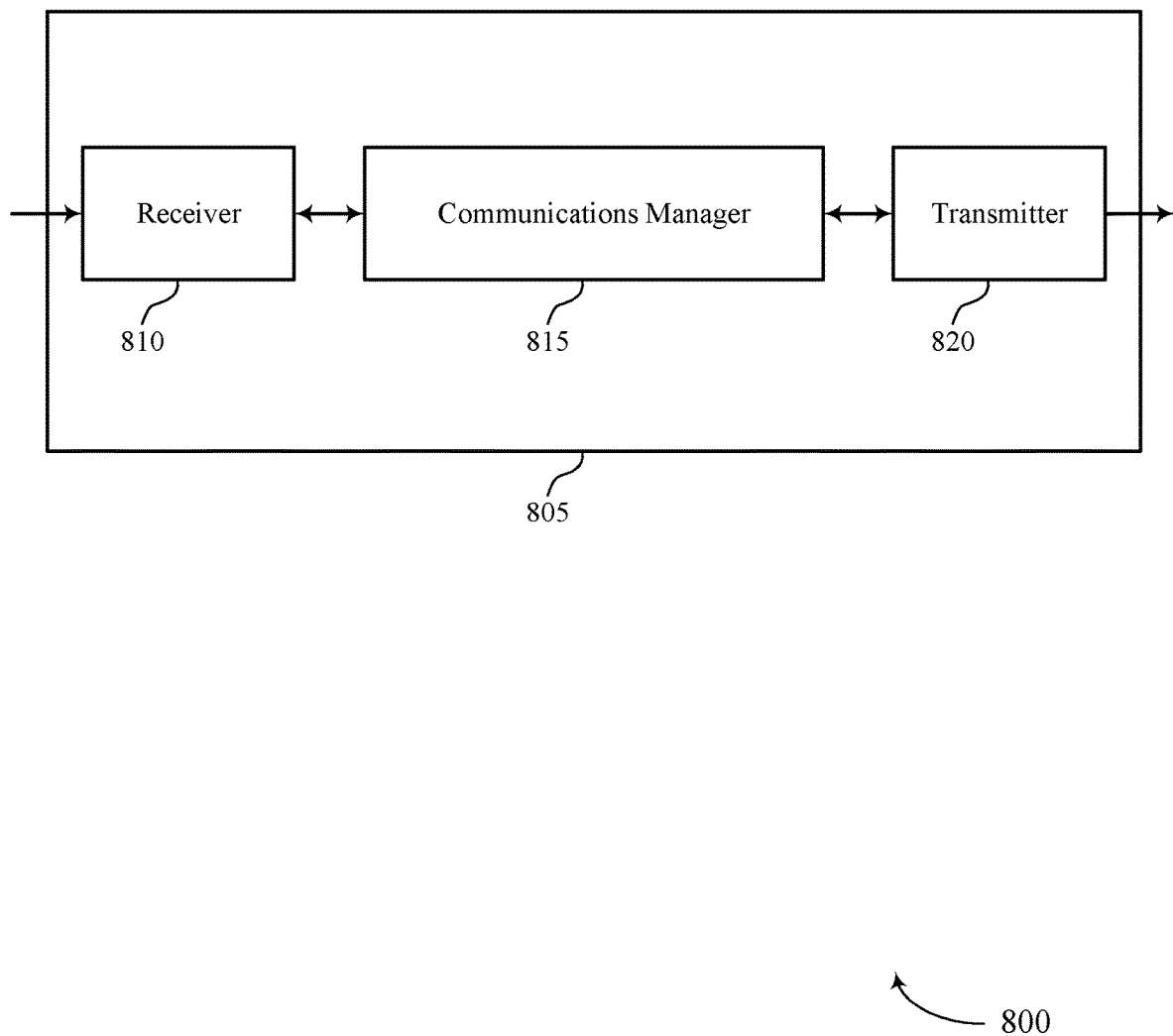
FIGS. 8 and 9 show block diagrams of devices that support DCI-based tone reservation for power control in accordance with one or more aspects of the present disclosure.

FIG. 8 shows a block diagram 800 of a device 805 that supports DCI-based tone reservation for power control in accordance with one or more aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to DCI-based tone reservation for power control, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine a set of allocated resources that a UE is to utilize for tone reservation, the set of allocated resources including a first set of tones for transmission of a data signal and a second set of tones for transmission of a peak-reduction signal, the first set of tones being different from the second set of tones, transmit DCI indicating the set of allocated resources, and receive, from the UE, the data signal on the first set of tones and the peak-reduction signal on the second set of tones based on the DCI. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
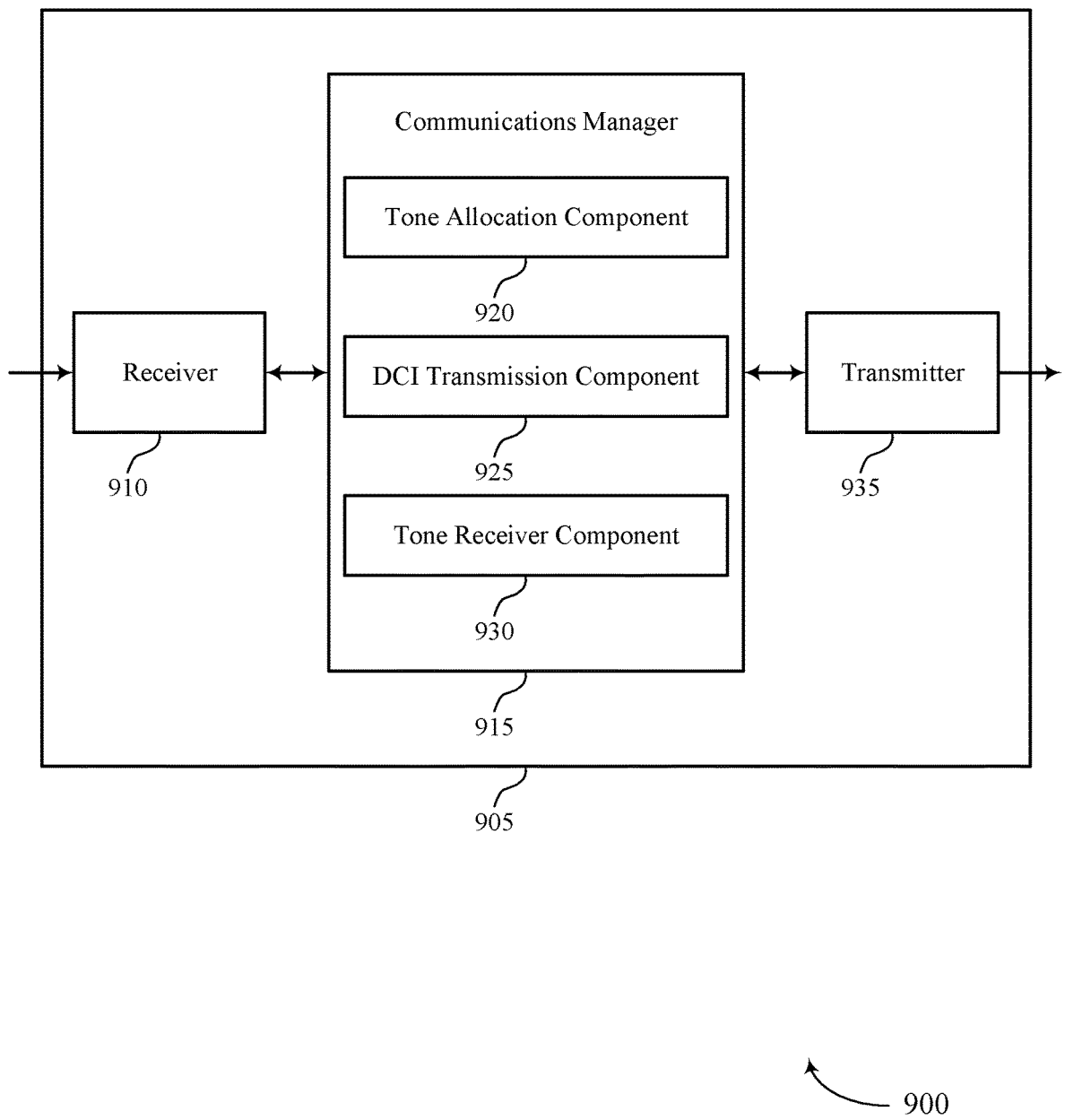

FIG. 9 shows a block diagram 900 of a device 905 that supports DCI-based tone reservation for power control in accordance with one or more aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to DCI-based tone reservation for power control, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a tone allocation component 920, a DCI transmission component 925, and a tone receiver component 930. The communications manager 915 may be an example of aspects of the communications manager 1110 described herein.

The tone allocation component 920 may determine a set of allocated resources that a UE is to utilize for tone reservation, the set of allocated resources including a first set of tones for transmission of a data signal and a second set of tones for transmission of a peak-reduction signal, the first set of tones being different from the second set of tones.

The DCI transmission component 925 may transmit DCI indicating the set of allocated resources.

The tone receiver component 930 may receive, from the UE, the data signal on the first set of tones and the peak-reduction signal on the second set of tones based on the DCI.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
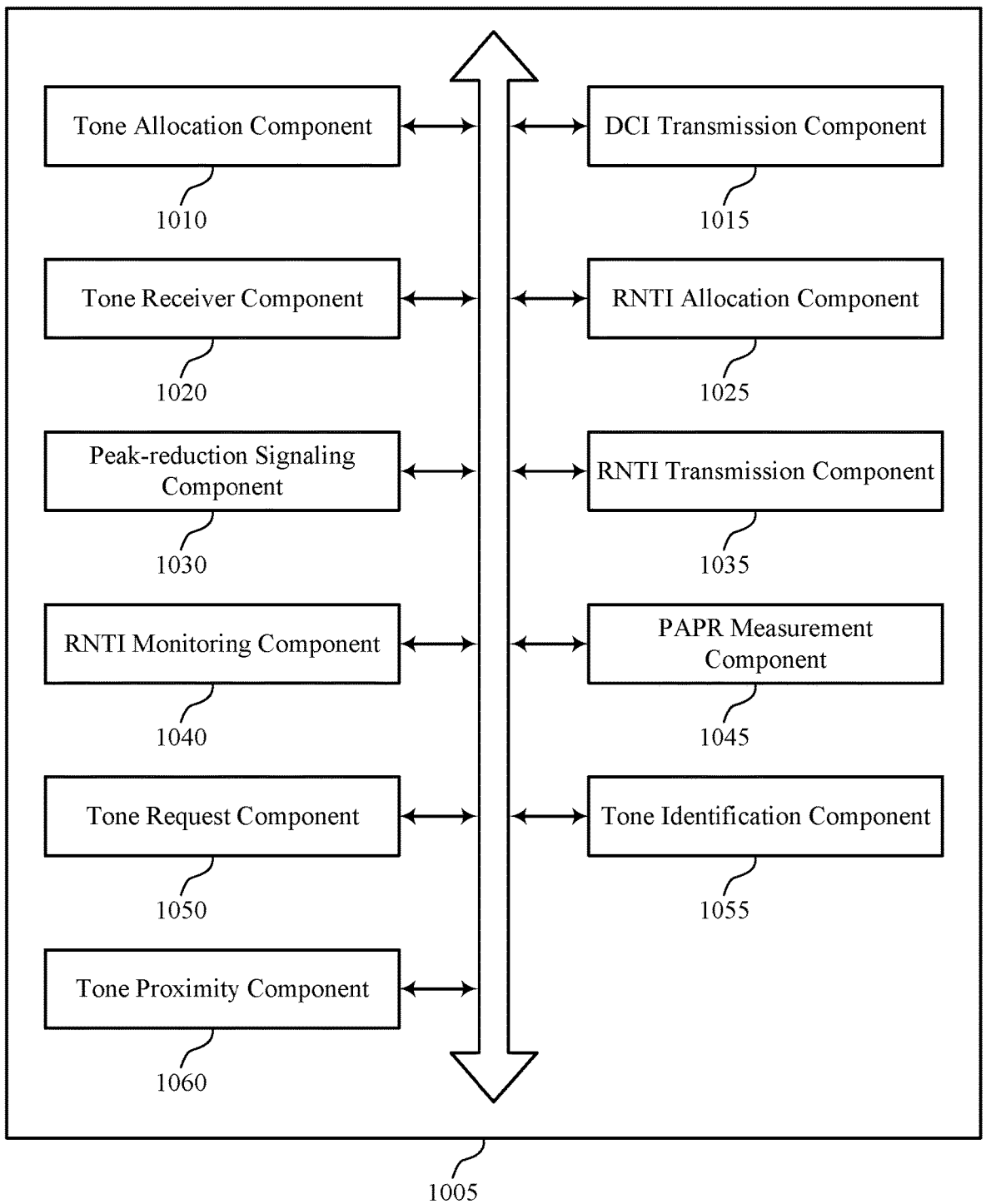
FIG. 10 shows a block diagram of a communications manager that supports DCI-based tone reservation for power control in accordance with one or more aspects of the present disclosure.

FIG. 10 shows a block diagram 1000 of a communications manager 1005 that supports DCI-based tone reservation for power control in accordance with one or more aspects of the present disclosure. The communications manager 1005 may be an example of aspects of a communications manager 815, a communications manager 915, or a communications manager 1110 described herein. The communications manager 1005 may include a tone allocation component 1010, a DCI transmission component 1015, a tone receiver component 1020, a RNTI allocation component 1025, a peak-reduction signaling component 1030, a RNTI transmission component 1035, a RNTI monitoring component 1040, a PAPR measurement component 1045, a tone request component 1050, a tone identification component 1055, and a tone proximity component 1060. Each of these modules may communicate, directly or indirectly, with one another (e.g., via one or more buses).

The tone allocation component 1010 may determine a set of allocated resources that a UE is to utilize for tone reservation, the set of allocated resources including a first set of tones for transmission of a data signal and a second set of tones for transmission of a peak-reduction signal, the first set of tones being different from the second set of tones.

The tone request component 1050 may receive, from the UE, a request for a number of tones to be allocated to the second set of tones for transmission of the peak-reduction signal in accordance with a reduced PAPR value. In some examples, the DCI transmission component 1015 may transmit the DCI based on the request.

The PAPR measurement component 1045 may determine the peak-reduction signal reduces a PAPR value associated with the uplink transmission. In some examples, the PAPR measurement component 1045 may identify a PAPR value for the UE that exceeds a threshold PAPR value for an uplink transmission.

In some examples, the tone allocation component 1010 may allocate the first set of tones to be within a threshold frequency distance from the second set of tones based on the identified PAPR value.

In some examples, the tone allocation component 1010 may identify a number of the second set of tones to allocate for transmission of the peak-reduction signal based on a function of the set of allocated resources. The DCI transmission component 1015 may transmit DCI indicating the set of allocated resources.

In some examples, determining the DCI includes a first DCI and a second DCI, the first DCI indicating the first set of tones and the second DCI indicating the second set of tones. In some examples, the DCI transmission component 1015 may transmit the DCI with the allocation of the first set of tones and the second set of tones. The tone identification component 1055 may determine that the second set of tones indicated in the DCI is common to the UE and one or more other UEs.

In some examples, the DCI transmission component 1015 may transmit the first DCI in a first codeword associated with a first RNTI. In some examples, the DCI transmission component 1015 may transmit the second DCI in a second codeword associated with a second RNTI, the first RNTI different from the second RNTI.

In some examples, the DCI transmission component 1015 may transmit the DCI to allocate the second set of tones for transmission of the peak-reduction signal. In some examples, DCI transmission component 1015 may transmit a control message that includes a configuration for the second set of tones.

In some examples, the tone receiver component 1020 may receive the first set of tones on a first beam of the set of allocated resources. In some examples, the tone receiver component 1020 may receive the second set of tones on a second beam of the set of allocated resources.

The RNTI allocation component 1025 may determine the second RNTI indicates one or more resources from a set of allocated resources for transmission of the second set of tones.

In some examples, the RNTI allocation component 1025 may identify a first RNTI associated the first set of tones for transmitting the data signal at the UE that is different from a second RNTI associated with the third set of tones for transmitting the second data signal by the second UE, the first RNTI and the second RNTI being different from a third RNTI that is common to the second set of tones and the fourth set of tones. The peak-reduction signaling component 1030 may receive a peak-reduction signal on the second set of tones based on the second RNTI.

The tone proximity component 1060 may identify a proximity relationship between the first set of tones and the second set of tones of the set of allocated resources, a tone reservation capability of the UE being based on the proximity relationship. In some examples, the DCI transmission component 1015 may determine the configuration of the DCI based on the tone reservation capability of the UE. In some examples, the tone proximity component 1060 may determine the proximity relationship is associated with a difference in frequency between the first set of tones and the second set of tones. In some examples, the peak-reduction signaling component 1030 may receive the data signal and the peak-reduction signal based on the proximity relationship.

In some examples, the peak-reduction signaling component 1030 may receive the peak-reduction signal on the second set of tones based on a simultaneous transmission by the first UE and the second UE. In some examples, the peak-reduction signaling component 1030 may receive the peak-reduction signal based on the overlap. In some examples, the peak reduction signaling component 1030 may transmit an indication that the second set of tones are not allocated for transmission of the peak reduction signal, and may determine that the UE is to refrain from monitoring an RNTI associated with the second set of tones based on the indication.

The RNTI transmission component 1035 may transmit a message including a monitoring configuration for the first RNTI and the second RNTI. The RNTI monitoring component 1040 may monitor for the first RNTI or the second RNTI based on receiving the monitoring configuration.

In some examples, the tone request component 1050 may receive, from the UE, an indication of a tone reservation capability for an uplink transmission by the UE. In some examples, the peak-reduction signaling component 1030 may receive the peak-reduction signal based on the tone reservation capability.

In some examples, the tone identification component 1055 may determine that the first set of tones for transmission of the data signal from the UE is different from a third set of tones for transmission of a second data signal from a second UE. In some examples, the tone identification component 1055 may determine that the second set of tones for transmission of the peak-reduction signal at the UE at least partially overlap with a fourth set of tones for transmission of a second peak reduction-signal by the second UE.

In some examples, the tone identification component 1055 may determine the second set of tones for transmission of the peak-reduction signal at least partially overlap with the third set of tones for transmission of the second data signal, the fourth set of tones for transmission of the second peak-reduction signal, or both.

The tone receiver component 1020 may receive, from the UE, the data signal on the first set of tones and the peak-reduction signal on the second set of tones based on the DCI. In some examples, the peak-reduction signaling component 1030 may receive the peak-reduction signal on the second set of tones allocated by the DCI.

Figure 11:
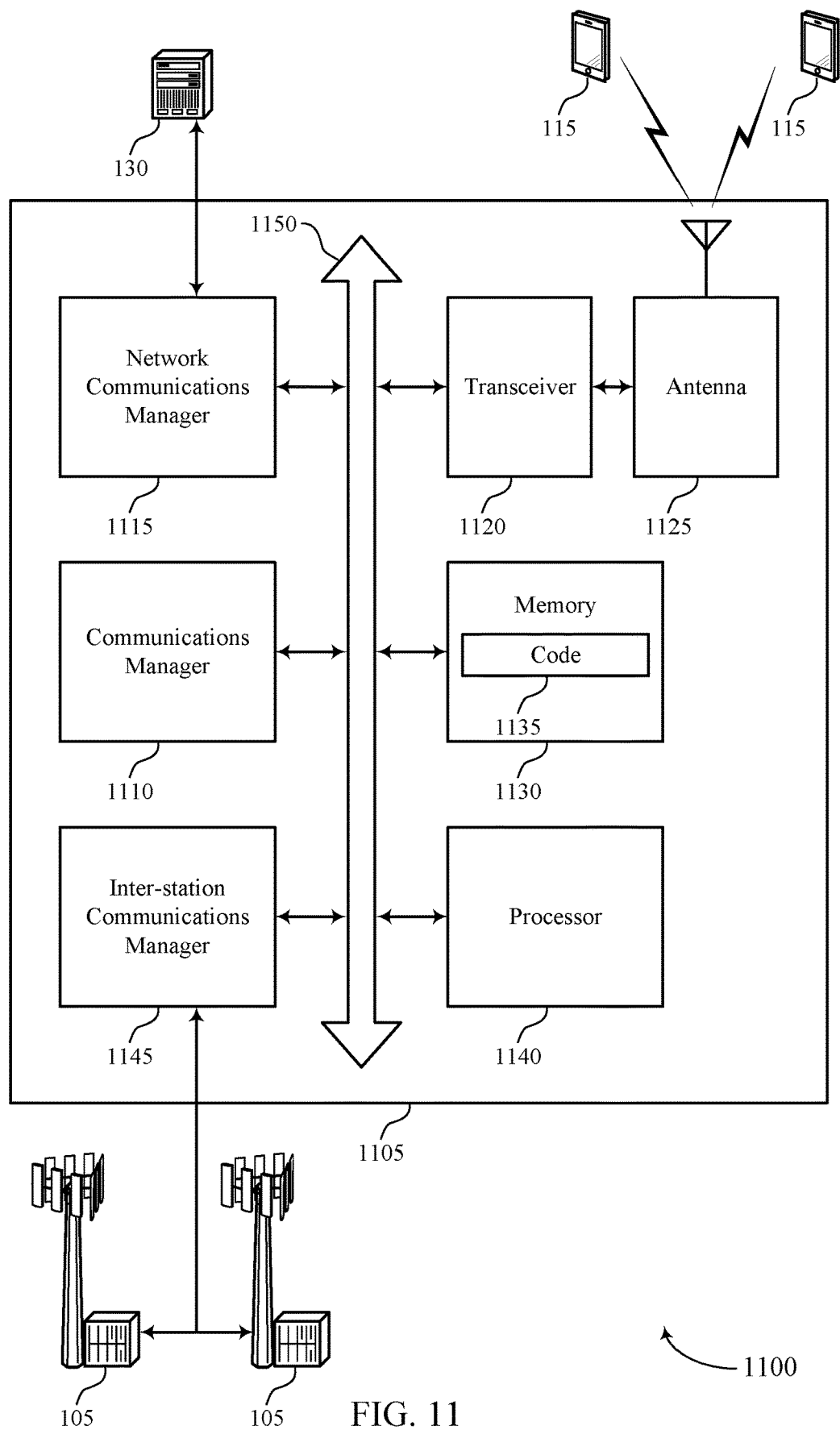
FIG. 11 shows a diagram of a system including a device that supports DCI-based tone reservation for power control in accordance with one or more aspects of the present disclosure.

FIG. 11 shows a diagram of a system 1100 including a device 1105 that supports DCI-based tone reservation for power control in accordance with one or more aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may determine a set of allocated resources that a UE is to utilize for tone reservation, the set of allocated resources including a first set of tones for transmission of a data signal and a second set of tones for transmission of a peak-reduction signal, the first set of tones being different from the second set of tones, transmit DCI indicating the set of allocated resources, and receive, from the UE, the data signal on the first set of tones and the peak-reduction signal on the second set of tones based on the DCI.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting DCI-based tone reservation for power control).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
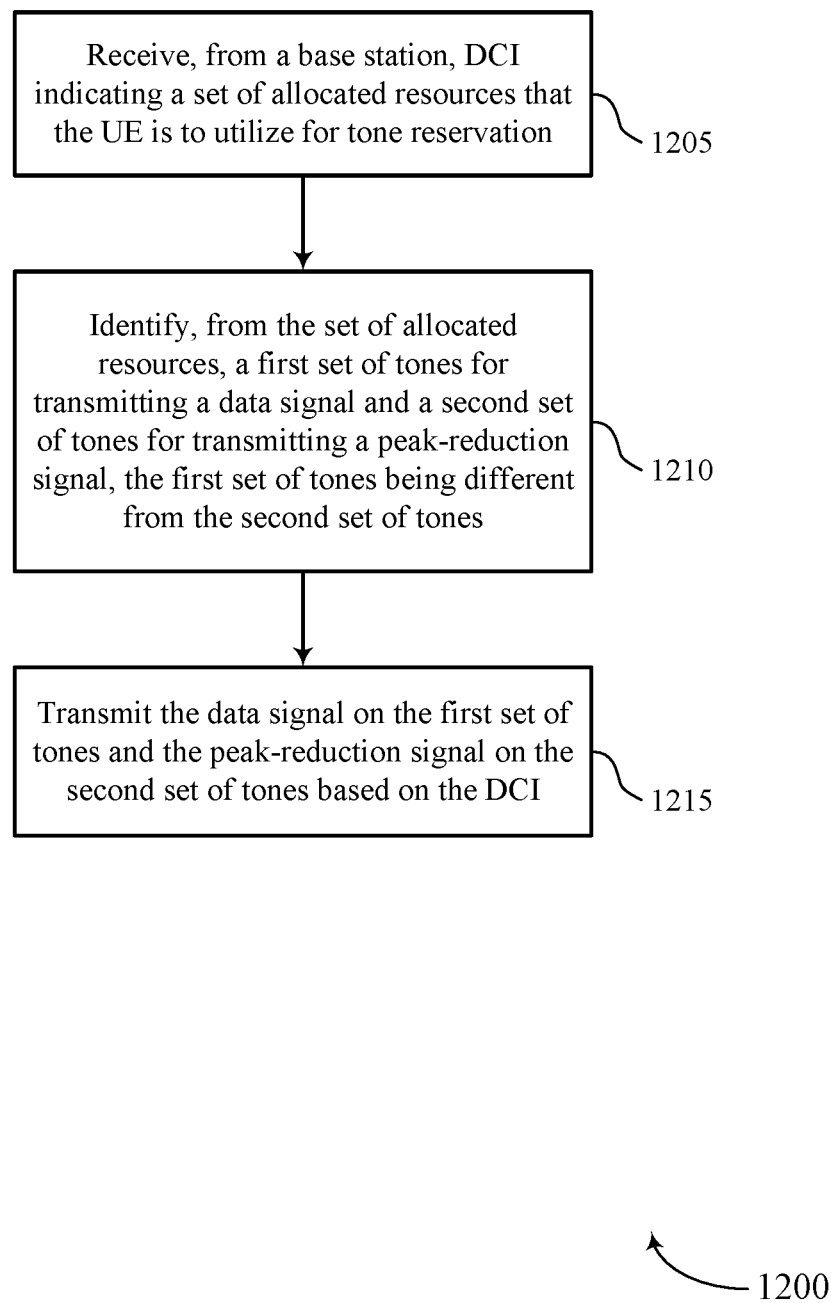
FIGS. 12 through 20 show flowcharts illustrating methods that support DCI-based tone reservation for power control in accordance with one or more aspects of the present disclosure.

FIG. 12 shows a flowchart illustrating a method 1200 that supports DCI-based tone reservation for power control in accordance with one or more aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive, from a base station, DCI indicating a set of allocated resources that the UE is to utilize for tone reservation. The operations of 1205 may be performed according to the methods described herein. In some examples, aspects of the operations of 1205 may be performed by a DCI receiving component as described with reference to FIGS. 4 through 7.

At 1210, the UE may identify, from the set of allocated resources, a first set of tones for transmitting a data signal and a second set of tones for transmitting a peak-reduction signal, the first set of tones being different from the second set of tones. The operations of 1210 may be performed according to the methods described herein. In some examples, aspects of the operations of 1210 may be performed by a tone identification component as described with reference to FIGS. 4 through 7.

At 1215, the UE may transmit the data signal on the first set of tones and the peak-reduction signal on the second set of tones based on the DCI. The operations of 1215 may be performed according to the methods described herein. In some examples, aspects of the operations of 1215 may be performed by a tone transmitter component as described with reference to FIGS. 4 through 7.

Figure 13:
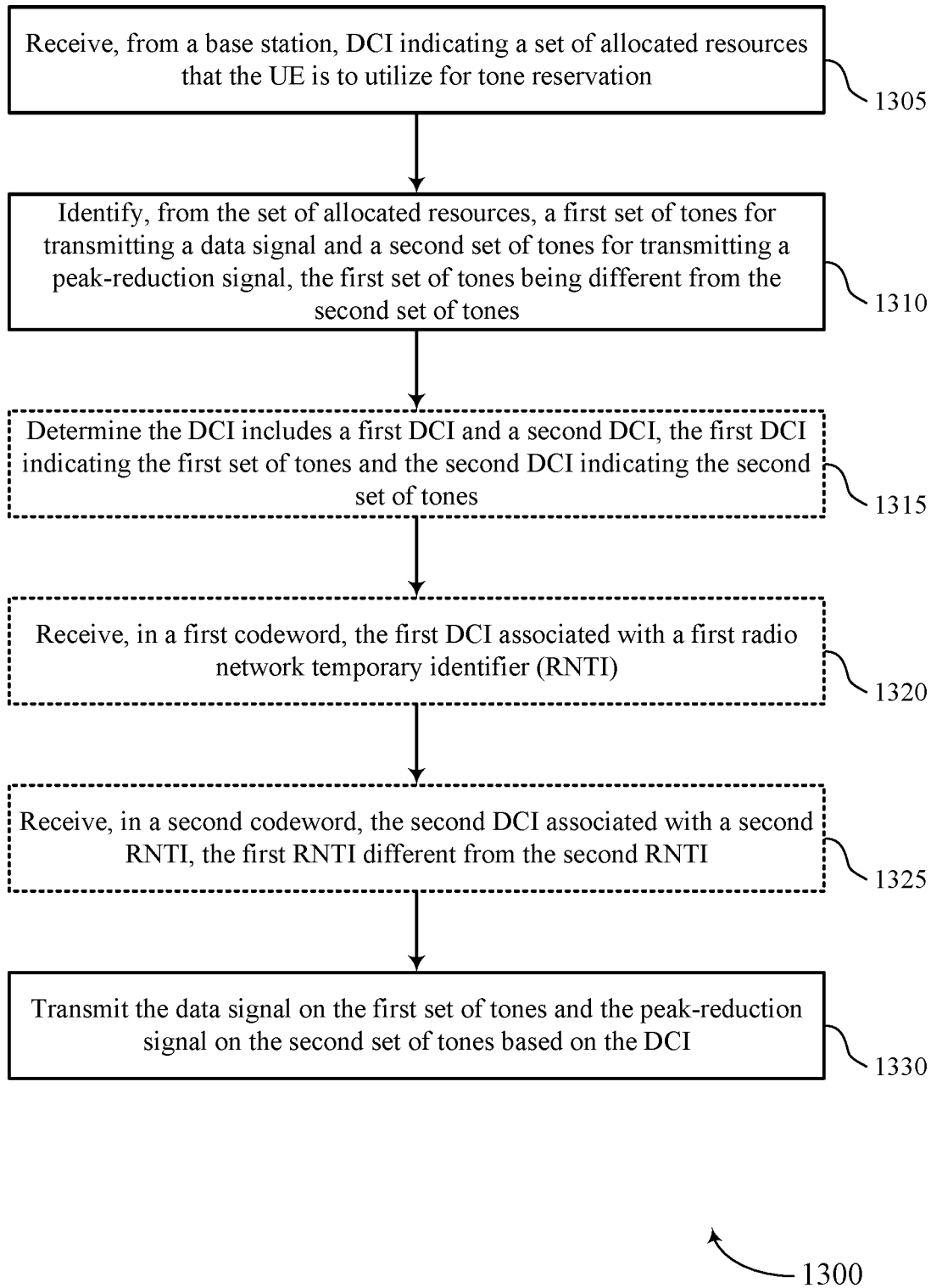

FIG. 13 shows a flowchart illustrating a method 1300 that supports DCI-based tone reservation for power control in accordance with one or more aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, DCI indicating a set of allocated resources that the UE is to utilize for tone reservation. The operations of 1305 may be performed according to the methods described herein. In some examples, aspects of the operations of 1305 may be performed by a DCI receiving component as described with reference to FIGS. 4 through 7.

At 1310, the UE may identify, from the set of allocated resources, a first set of tones for transmitting a data signal and a second set of tones for transmitting a peak-reduction signal, the first set of tones being different from the second set of tones. The operations of 1310 may be performed according to the methods described herein. In some examples, aspects of the operations of 1310 may be performed by a tone identification component as described with reference to FIGS. 4 through 7.

At 1315, the UE may determine the DCI includes a first DCI and a second DCI, the first DCI indicating the first set of tones and the second DCI indicating the second set of tones. The operations of 1315 may be performed according to the methods described herein. In some examples, aspects of the operations of 1315 may be performed by a DCI receiving component as described with reference to FIGS. 4 through 7.

At 1320, the UE may receive, in a first codeword, the first DCI associated with a first radio network temporary identifier RNTI. The operations of 1320 may be performed according to the methods described herein. In some examples, aspects of the operations of 1320 may be performed by a RNTI receiving component as described with reference to FIGS. 4 through 7.

At 1325, the UE may receive, in a second codeword, the second DCI associated with a second RNTI, the first RNTI different from the second RNTI. The operations of 1325 may be performed according to the methods described herein. In some examples, aspects of the operations of 1325 may be performed by a RNTI receiving component as described with reference to FIGS. 4 through 7.

At 1330, the UE may transmit the data signal on the first set of tones and the peak-reduction signal on the second set of tones based on the DCI. The operations of 1330 may be performed according to the methods described herein. In some examples, aspects of the operations of 1330 may be performed by a tone transmitter component as described with reference to FIGS. 4 through 7.

Figure 14:
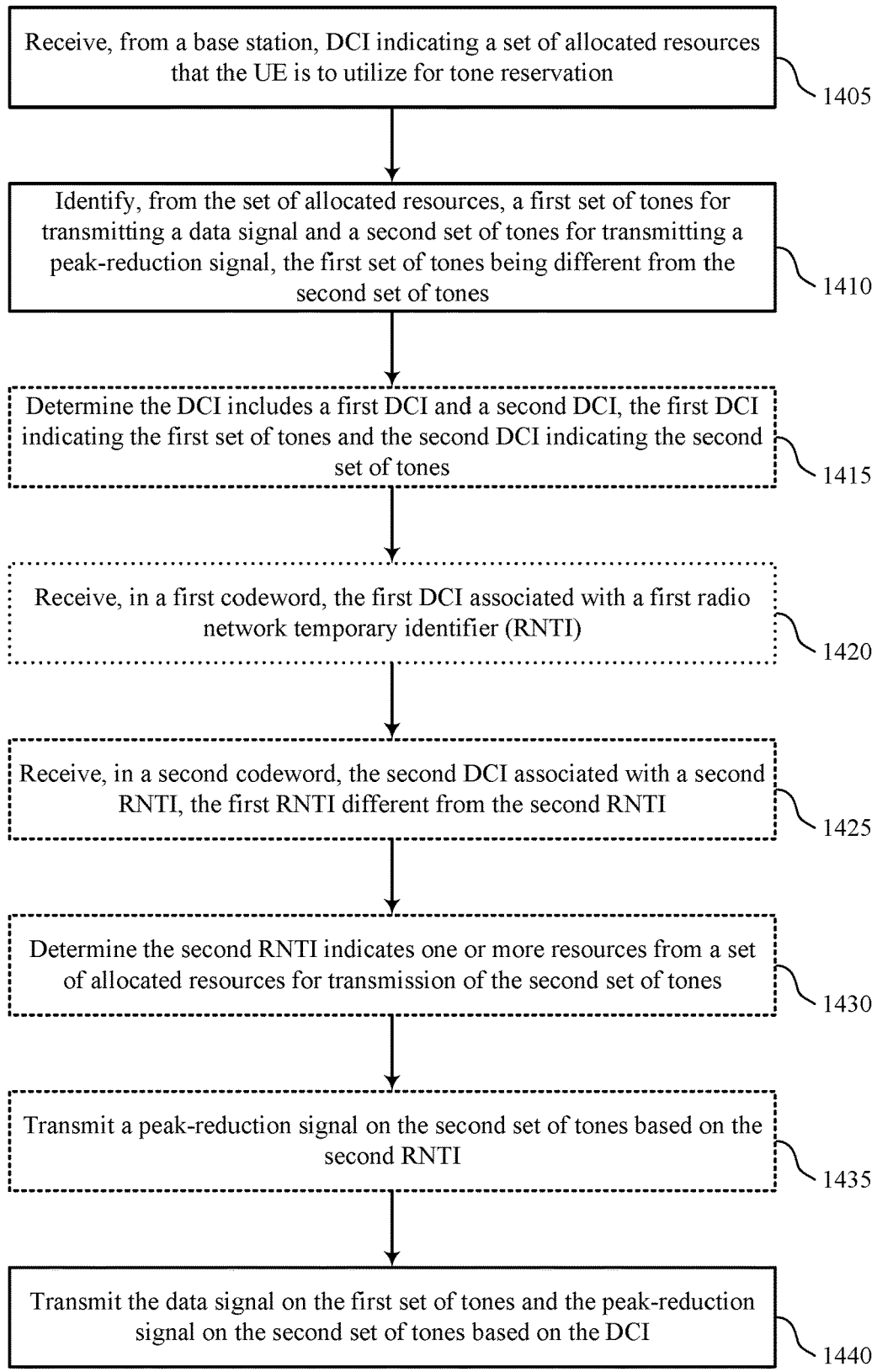

FIG. 14 shows a flowchart illustrating a method 1400 that supports DCI-based tone reservation for power control in accordance with one or more aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, DCI indicating a set of allocated resources that the UE is to utilize for tone reservation. The operations of 1405 may be performed according to the methods described herein. In some examples, aspects of the operations of 1405 may be performed by a DCI receiving component as described with reference to FIGS. 4 through 7.

At 1410, the UE may identify, from the set of allocated resources, a first set of tones for transmitting a data signal and a second set of tones for transmitting a peak-reduction signal, the first set of tones being different from the second set of tones. The operations of 1410 may be performed according to the methods described herein. In some examples, aspects of the operations of 1410 may be performed by a tone identification component as described with reference to FIGS. 4 through 7.

At 1415, the UE may determine the DCI includes a first DCI and a second DCI, the first DCI indicating the first set of tones and the second DCI indicating the second set of tones. The operations of 1415 may be performed according to the methods described herein. In some examples, aspects of the operations of 1415 may be performed by a DCI receiving component as described with reference to FIGS. 4 through 7.

At 1420, the UE may receive, in a first codeword, the first DCI associated with a first RNTI. The operations of 1420 may be performed according to the methods described herein. In some examples, aspects of the operations of 1420 may be performed by a RNTI receiving component as described with reference to FIGS. 4 through 7.

At 1425, the UE may receive, in a second codeword, the second DCI associated with a second RNTI, the first RNTI different from the second RNTI. The operations of 1425 may be performed according to the methods described herein. In some examples, aspects of the operations of 1425 may be performed by a RNTI receiving component as described with reference to FIGS. 4 through 7.

At 1430, the UE may determine the second RNTI indicates one or more resources from a set of allocated resources for transmission of the second set of tones. The operations of 1430 may be performed according to the methods described herein. In some examples, aspects of the operations of 1430 may be performed by a RNTI receiving component as described with reference to FIGS. 4 through 7.

At 1435, the UE may transmit a peak-reduction signal on the second set of tones based on the second RNTI. The operations of 1435 may be performed according to the methods described herein. In some examples, aspects of the operations of 1435 may be performed by a tone transmitter component as described with reference to FIGS. 4 through 7.

At 1440, the UE may transmit the data signal on the first set of tones and the peak-reduction signal on the second set of tones based on the DCI. The operations of 1440 may be performed according to the methods described herein. In some examples, aspects of the operations of 1440 may be performed by a tone transmitter component as described with reference to FIGS. 4 through 7.

Figure 15:
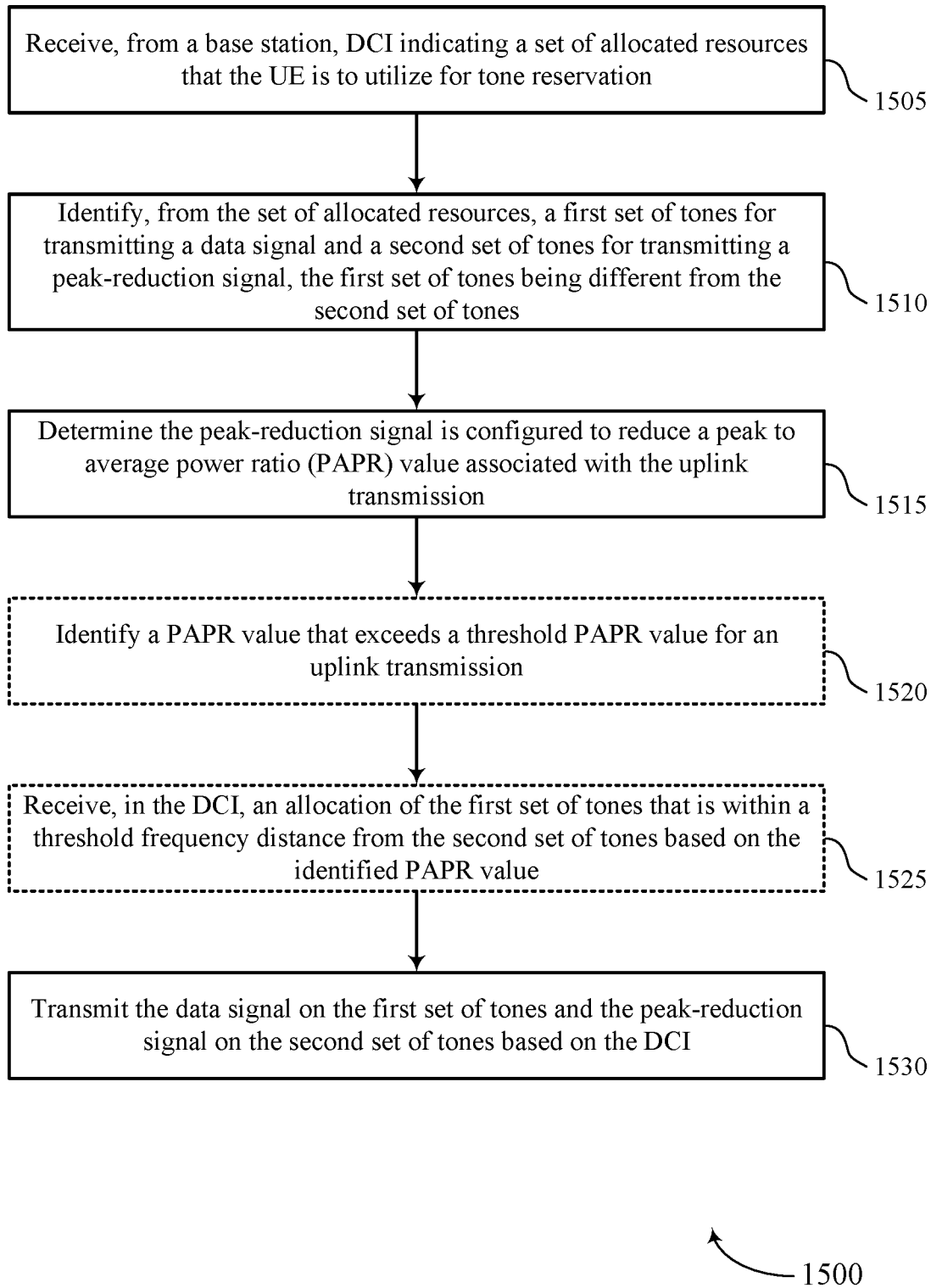

FIG. 15 shows a flowchart illustrating a method 1500 that supports DCI-based tone reservation for power control in accordance with one or more aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, DCI indicating a set of allocated resources that the UE is to utilize for tone reservation. The operations of 1505 may be performed according to the methods described herein. In some examples, aspects of the operations of 1505 may be performed by a DCI receiving component as described with reference to FIGS. 4 through 7.

At 1510, the UE may identify, from the set of allocated resources, a first set of tones for transmitting a data signal and a second set of tones for transmitting a peak-reduction signal, the first set of tones being different from the second set of tones. The operations of 1510 may be performed according to the methods described herein. In some examples, aspects of the operations of 1510 may be performed by a tone identification component as described with reference to FIGS. 4 through 7.

At 1515, the UE may determine the peak-reduction signal reduces a PAPR value associated with the uplink transmission. The operations of 1515 may be performed according to the methods described herein. In some examples, aspects of the operations of 1515 may be performed by a PAPR measurement component as described with reference to FIGS. 4 through 7.

At 1520, the UE may identify a PAPR value that exceeds a threshold PAPR value for an uplink transmission. The operations of 1520 may be performed according to the methods described herein. In some examples, aspects of the operations of 1520 may be performed by a PAPR measurement component as described with reference to FIGS. 4 through 7.

At 1525, the UE may receive, in the DCI, an allocation of the first set of tones that is within a threshold frequency distance from the second set of tones based on the identified PAPR value. The operations of 1525 may be performed according to the methods described herein. In some examples, aspects of the operations of 1525 may be performed by a DCI receiving component as described with reference to FIGS. 4 through 7.

At 1530, the UE may transmit the data signal on the first set of tones and the peak-reduction signal on the second set of tones based on the DCI. The operations of 1530 may be performed according to the methods described herein. In some examples, aspects of the operations of 1530 may be performed by a tone transmitter component as described with reference to FIGS. 4 through 7.

Figure 16:
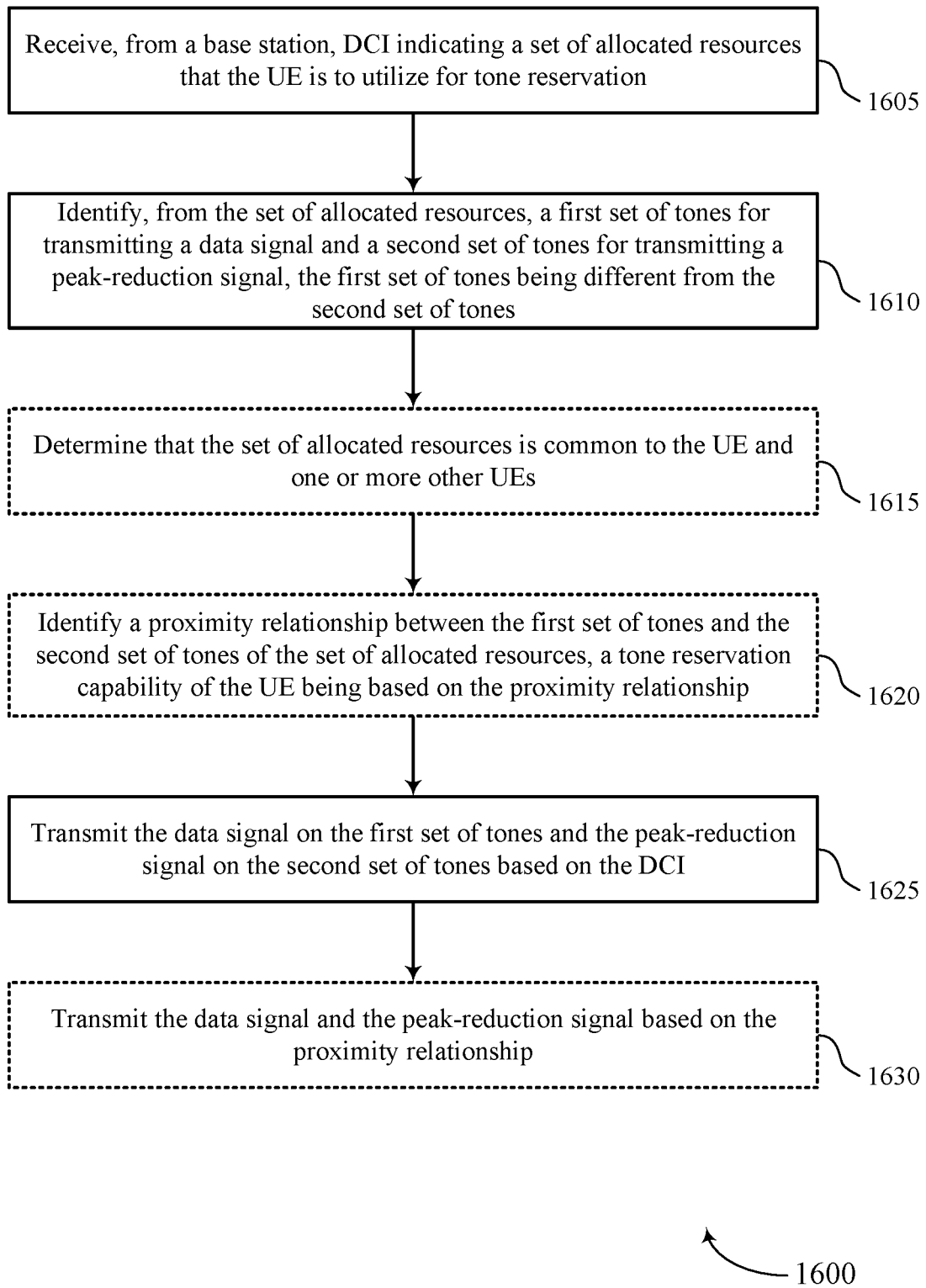

FIG. 16 shows a flowchart illustrating a method 1600 that supports DCI-based tone reservation for power control in accordance with one or more aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, DCI indicating a set of allocated resources that the UE is to utilize for tone reservation. The operations of 1605 may be performed according to the methods described herein. In some examples, aspects of the operations of 1605 may be performed by a DCI receiving component as described with reference to FIGS. 4 through 7.

At 1610, the UE may identify, from the set of allocated resources, a first set of tones for transmitting a data signal and a second set of tones for transmitting a peak-reduction signal, the first set of tones being different from the second set of tones. The operations of 1610 may be performed according to the methods described herein. In some examples, aspects of the operations of 1610 may be performed by a tone identification component as described with reference to FIGS. 4 through 7.

At 1615, the UE may determine that the second set of tones is common to the UE and one or more other UEs. The operations of 1615 may be performed according to the methods described herein. In some examples, aspects of the operations of 1615 may be performed by a tone identification component as described with reference to FIGS. 4 through 7.

At 1620, the UE may identify a proximity relationship between the first set of tones and the second set of tones of the set of allocated resources, a tone reservation capability of the UE being based on the proximity relationship. The operations of 1620 may be performed according to the methods described herein. In some examples, aspects of the operations of 1620 may be performed by a tone proximity component as described with reference to FIGS. 4 through 7.

At 1625, the UE may transmit the data signal on the first set of tones and the peak-reduction signal on the second set of tones based on the DCI. The operations of 1625 may be performed according to the methods described herein. In some examples, aspects of the operations of 1625 may be performed by a tone transmitter component as described with reference to FIGS. 4 through 7.

At 1630, the UE may transmit the data signal and the peak-reduction signal based on the proximity relationship. The operations of 1630 may be performed according to the methods described herein. In some examples, aspects of the operations of 1630 may be performed by a data signaling component as described with reference to FIGS. 4 through 7.

Figure 17:
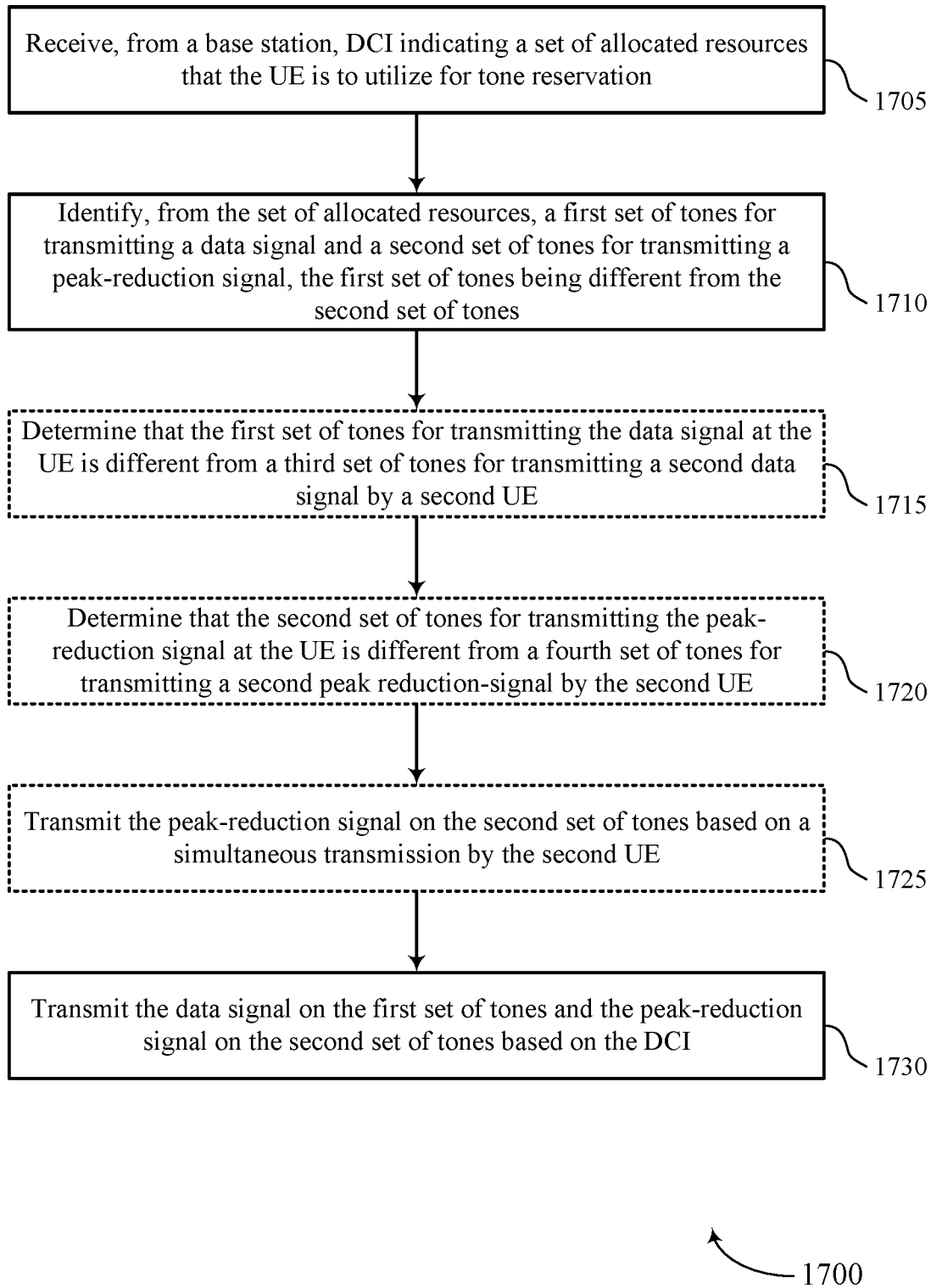

FIG. 17 shows a flowchart illustrating a method 1700 that supports DCI-based tone reservation for power control in accordance with one or more aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, DCI indicating a set of allocated resources that the UE is to utilize for tone reservation. The operations of 1705 may be performed according to the methods described herein. In some examples, aspects of the operations of 1705 may be performed by a DCI receiving component as described with reference to FIGS. 4 through 7.

At 1710, the UE may identify, from the set of allocated resources, a first set of tones for transmitting a data signal and a second set of tones for transmitting a peak-reduction signal, the first set of tones being different from the second set of tones. The operations of 1710 may be performed according to the methods described herein. In some examples, aspects of the operations of 1710 may be performed by a tone identification component as described with reference to FIGS. 4 through 7.

At 1715, the UE may determine that the first set of tones for transmitting the data signal at the UE is different from a third set of tones for transmitting a second data signal by a second UE. The operations of 1715 may be performed according to the methods described herein. In some examples, aspects of the operations of 1715 may be performed by a tone identification component as described with reference to FIGS. 4 through 7.

At 1720, the UE may determine that the second set of tones for transmitting the peak-reduction signal at the UE at least partially overlap with a fourth set of tones for transmitting a second peak reduction-signal by the second UE. The operations of 1720 may be performed according to the methods described herein. In some examples, aspects of the operations of 1720 may be performed by a tone identification component as described with reference to FIGS. 4 through 7.

At 1725, the UE may transmit the peak-reduction signal on the second set of tones based on a simultaneous transmission by the second UE. The operations of 1725 may be performed according to the methods described herein. In some examples, aspects of the operations of 1725 may be performed by a peak-reduction signaling component as described with reference to FIGS. 4 through 7.

At 1730, the UE may transmit the data signal on the first set of tones and the peak-reduction signal on the second set of tones based on the DCI. The operations of 1730 may be performed according to the methods described herein. In some examples, aspects of the operations of 1730 may be performed by a tone transmitter component as described with reference to FIGS. 4 through 7.

Figure 18:
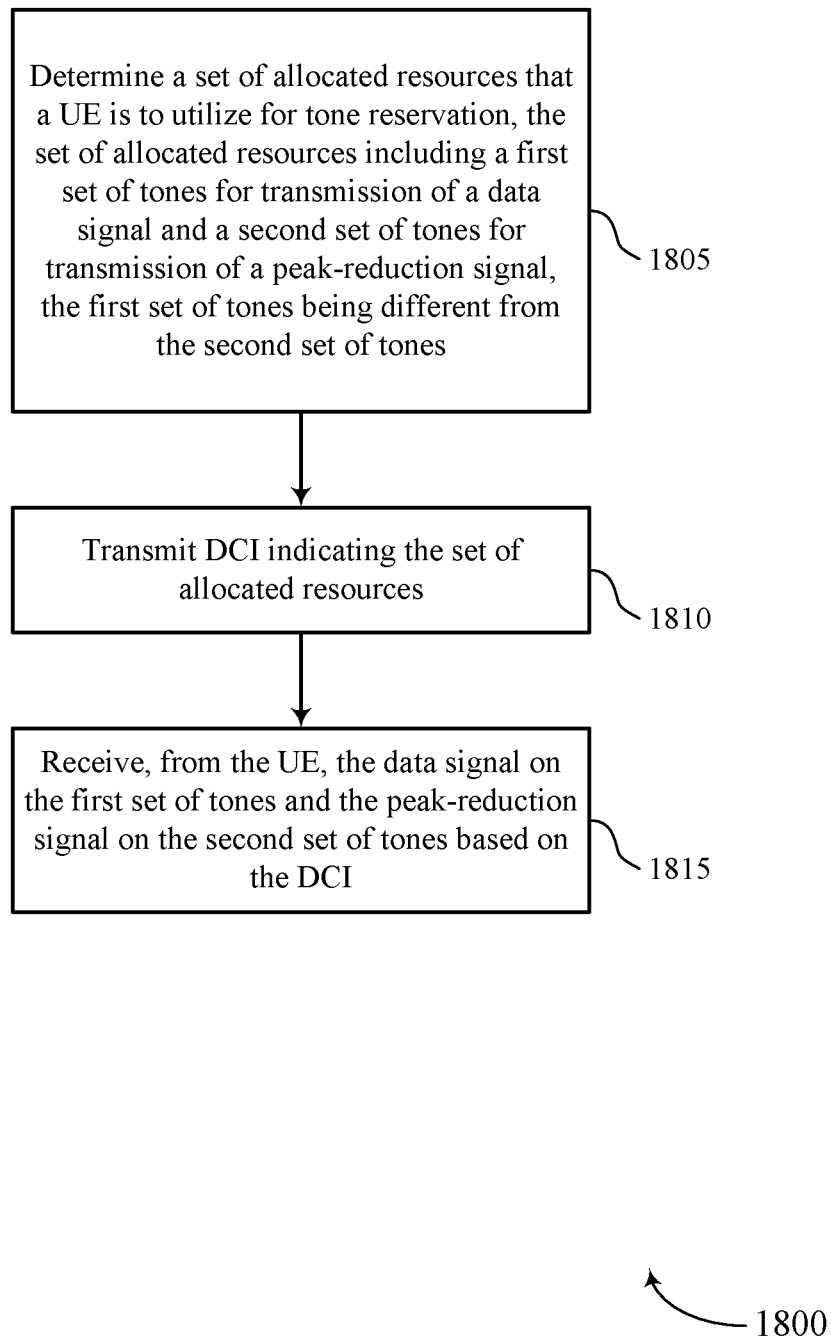

FIG. 18 shows a flowchart illustrating a method 1800 that supports DCI-based tone reservation for power control in accordance with one or more aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1805, the base station may determine a set of allocated resources that a UE is to utilize for tone reservation, the set of allocated resources including a first set of tones for transmission of a data signal and a second set of tones for transmission of a peak-reduction signal, the first set of tones being different from the second set of tones. The operations of 1805 may be performed according to the methods described herein. In some examples, aspects of the operations of 1805 may be performed by a tone allocation component as described with reference to FIGS. 8 through 11.

At 1810, the base station may transmit DCI indicating the set of allocated resources. The operations of 1810 may be performed according to the methods described herein. In some examples, aspects of the operations of 1810 may be performed by a DCI transmission component as described with reference to FIGS. 8 through 11.

At 1815, the base station may receive, from the UE, the data signal on the first set of tones and the peak-reduction signal on the second set of tones based on the DCI. The operations of 1815 may be performed according to the methods described herein. In some examples, aspects of the operations of 1815 may be performed by a tone receiver component as described with reference to FIGS. 8 through 11.

Figure 19:
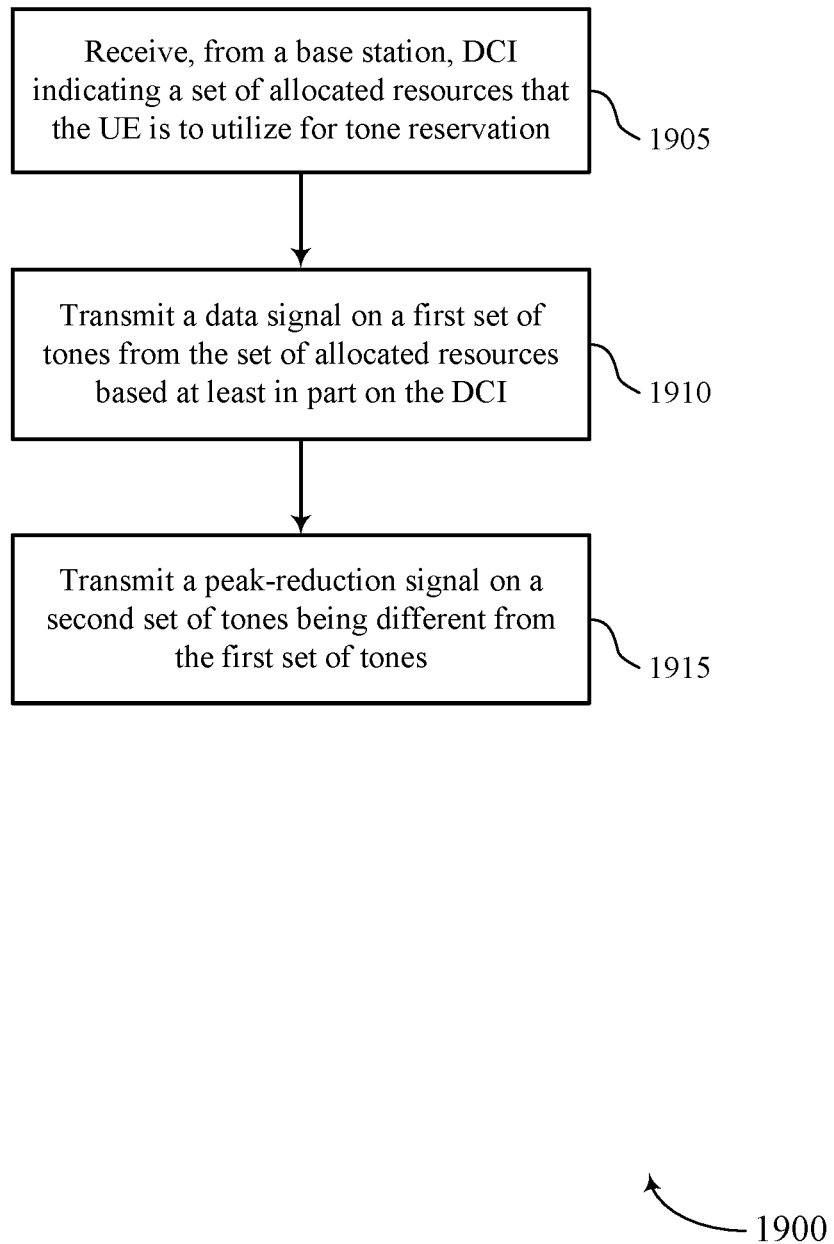

FIG. 19 shows a flowchart illustrating a method 1900 that supports DCI-based tone reservation for power control in accordance with one or more aspects of the present disclosure. The operations of method 1900 may be implemented by a UE 115 or its components as described herein. For example, the operations of method 1900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1905, the UE may receive, from a base station, DCI indicating a set of allocated resources that the UE is to utilize for tone reservation. The operations of 1905 may be performed according to the methods described herein. In some examples, aspects of the operations of 1905 may be performed by a DCI receiving component as described with reference to FIGS. 4 through 7.

At 1910, the UE may transmit a data signal on a first set of tones from the set of allocated resources based at least in part on the DCI. The operations of 1910 may be performed according to the methods described herein. In some examples, aspects of the operations of 1910 may be performed by a tone identification component as described with reference to FIGS. 4 through 7.

At 1915, the UE may transmit a peak-reduction signal on a second set of tones being different from the first set of tones. The operations of 1915 may be performed according to the methods described herein. In some examples, aspects of the operations of 1915 may be performed by a tone transmitter component as described with reference to FIGS. 4 through 7.

Figure 20:
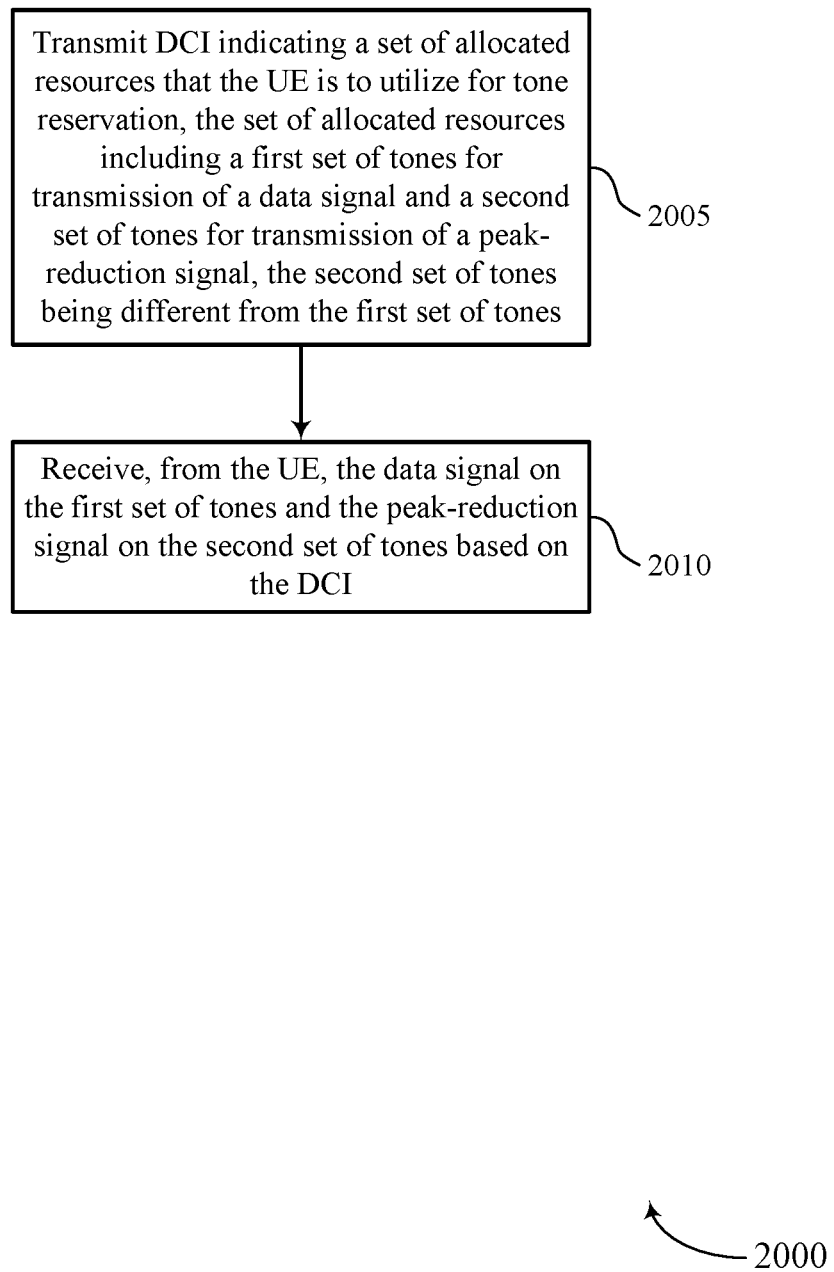

FIG. 20 shows a flowchart illustrating a method 2000 that supports DCI-based tone reservation for power control in accordance with one or more aspects of the present disclosure. The operations of method 2000 may be implemented by a UE 115 or its components as described herein. For example, the operations of method 2000 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 2005, the base station may transmit DCI indicating a set of allocated resources that the UE is to utilize for tone reservation, the set of allocated resources including a first set of tones for transmission of a data signal and a second set of tones for transmission of a peak-reduction signal, the second set of tones being different from the first set of tones. The operations of 2005 may be performed according to the methods described herein. In some examples, aspects of the operations of 2005 may be performed by a DCI transmitting component as described with reference to FIGS. 4 through 7.

At 2010, the base station may receive, from the UE, the data signal on the first set of tones and the peak-reduction signal on the second set of tones based on the DCI. The operations of 2010 may be performed according to the methods described herein. In some examples, aspects of the operations of 2010 may be performed by a tone identification component as described with reference to FIGS. 4 through 7.

The following provides an overview of aspects of the present disclosure:

Aspect 1: A method for wireless communications at a UE, comprising: receiving, from a base station, DCI indicating a set of allocated resources that the UE is to utilize for tone reservation; transmitting a data signal on a first set of tones from the set of allocated resources based at least in part on the DCI; and transmitting a peak-reduction signal on a second set of tones being different from the first set of tones.

Aspect 2: The method of aspect 1, further comprising: determining the DCI comprises a first DCI and a second DCI, the first DCI indicating the first set of tones and the second DCI indicating the second set of tones; receiving, in a first codeword, the first DCI associated with a first RNTI; and receiving, in a second codeword, the second DCI associated with a second RNTI, the first RNTI different from the second RNTI.

Aspect 3: The method of aspect 2, further comprising: determining the second RNTI indicates one or more resources from a set of allocated resources for transmission of the second set of tones; and transmitting a peak-reduction signal on the second set of tones based at least in part on the second RNTI.

Aspect 4: The method of any of aspects 2 through 3, wherein the first codeword and the first RNTI being different from the second codeword and the second RNTI.

Aspect 5: The method of any of aspects 2 through 4, further comprising: receiving a message comprising a monitoring configuration for the first RNTI and the second RNTI; and monitoring for the first RNTI or the second RNTI based at least in part on receiving the monitoring configuration.

Aspect 6: The method of aspect 5, wherein the monitoring configuration comprising an RRC message, a RMSI message, or both.

Aspect 7: The method of any of aspects 1 through 6, further comprising: determining the DCI comprises a first field and a second field, the first field indicating the first set of tones and the second field indicating the second set of tones; and receiving, in a codeword, the first field and the second field.

Aspect 8: The method of any of aspects 1 through 7, further comprising: determining the peak-reduction signal reduces a PAPR value associated with the uplink transmission; identifying a PAPR value that exceeds a threshold PAPR value for an uplink transmission; and receiving, in the DCI, an allocation of the first set of tones that is within a threshold frequency distance from the second set of tones based at least in part on the identified PAPR value.

Aspect 9: The method of aspect 8, further comprising: transmitting, to the base station, a request for a number of tones to be allocated to the second set of tones for transmission of the peak-reduction signal in accordance with a reduced PAPR value; and receiving the DCI based at least in part on the request.

Aspect 10: The method of aspect 9, wherein the request for the number of tones comprising at least portion of a power headroom report.

Aspect 11: The method of any of aspects 1 through 10, further comprising: determining that the second set of tones is common to the UE and one or more other UEs; identifying a proximity relationship between the first set of tones and the second set of tones of the set of allocated resources, a tone reservation capability of the UE being based at least in part on the proximity relationship; and transmitting the data signal and the peak-reduction signal based at least in part on the proximity relationship.

Aspect 12: The method of aspect 11, further comprising: determining the proximity relationship is associated with a difference in frequency between the first set of tones and the second set of tones.

Aspect 13: The method of any of aspects 1 through 12, further comprising: transmitting, to a base station, an indication of a tone reservation capability for an uplink transmission by the UE; determining the set of allocated resources is scheduled by the DCI in accordance with the tone reservation capability of the UE; and configuring the peak-reduction signal based at least in part on the tone reservation capability.

Aspect 14: The method of aspect 13, wherein the tone reservation capability of the UE comprising a power amplification class, a number of antenna elements, a number of radio frequency chains, a number of multiple-input multiple-output layers, a maximum power reduction value, or any combination thereof.

Aspect 15: The method of any of aspects 1 through 14, further comprising: determining that the first set of tones for transmitting the data signal at the UE is different from a third set of tones for transmitting a second data signal by a second UE; determining that the second set of tones for transmitting the peak-reduction signal at the UE at least partially overlap with a fourth set of tones for transmitting a second peak reduction-signal by the second UE; and transmitting the peak-reduction signal on the second set of tones based at least in part on a simultaneous transmission by the second UE.

Aspect 16: The method of aspect 15, further comprising: identifying a first RNTI associated the first set of tones for transmitting the data signal at the UE that is different from a second RNTI associated with the third set of tones for transmitting the second data signal by the second UE, the first RNTI and the second RNTI being different from a third RNTI that is common to the second set of tones and the fourth set of tones.

Aspect 17: The method of any of aspects 15 through 16, further comprising: determining the second set of tones for transmitting the peak-reduction signal at least partially overlap with the third set of tones for transmitting the second data signal, the fourth set of tones for transmitting the second peak-reduction signal, or both; and transmitting the peak-reduction signal based at least in part on the overlap.

Aspect 18: The method of any of aspects 15 through 17, further comprising: transmitting the first set of tones on a first beam of the set of allocated resources; and transmitting the second set of tones on a second beam of the set of allocated resources.

Aspect 19: The method of any of aspects 1 through 18, further comprising: determining that the DCI indicates whether the second set of tones are allocated for transmission of the peak-reduction signal; identifying a number of the second set of tones based at least in part on a function of the set of allocated resources; and transmitting the peak-reduction signal on the second set of tones allocated by the DCI.

Aspect 20: The method of aspect 19, further comprising: refraining from monitoring an RNTI associated with the second set of tones based at least in part on a determination that the second set of tones are not allocated for transmission of the peak-reduction signal.

Aspect 21: The method of any of aspects 19 through 20, wherein the function of the set of allocated resources comprising a fraction of the set of allocated resources, a fraction of a total number of tones, or both.

Aspect 22: The method of any of aspects 19 through 21, further comprising: receiving a control message that comprises a configuration for the second set of tones.

Aspect 23: A method for wireless communications at a base station, comprising: transmitting DCI indicating a set of allocated resources that a UE is to utilize for tone reservation, the set of allocated resources comprising a first set of tones for transmission of a data signal and a second set of tones for transmission of a peak-reduction signal, the second set of tones being different from the first set of tones; and receiving, from the UE, the data signal on the first set of tones and the peak-reduction signal on the second set of tones based at least in part on the DCI.

Aspect 24: The method of aspect 23, further comprising: determining the DCI comprises a first DCI and a second DCI, the first DCI indicating the first set of tones and the second DCI indicating the second set of tones; transmitting the first DCI in a first codeword associated with a first RNTI; and transmitting the second DCI in a second codeword associated with a second RNTI, the first RNTI different from the second RNTI.

Aspect 25: The method of aspect 24, further comprising: determining the second RNTI indicates one or more resources from a set of allocated resources for transmission of the second set of tones; and receiving a peak-reduction signal on the second set of tones based at least in part on the second RNTI.

Aspect 26: The method of any of aspects 24 through 25, wherein the first codeword and the first RNTI being different from the second codeword and the second RNTI.

Aspect 27: The method of any of aspects 24 through 26, further comprising: transmitting a message comprising a monitoring configuration for the first RNTI and the second RNTI; and monitoring for the first RNTI or the second RNTI based at least in part on receiving the monitoring configuration.

Aspect 28: The method of any of aspects 24 through 27, further comprising: transmitting, in a codeword, the DCI comprising a first field and a second field, the first field indicating the first set of tones and the second field indicating the second set of tones.

Aspect 29: An apparatus for wireless communications at a UE, comprising a processor and memory coupled with the processor. The processor and memory may be configured to perform a method of any of aspects 1 through 22.

Aspect 30: An apparatus for wireless communications at a UE, comprising at least one means for performing a method of any of aspects 1 through 22.

Aspect 31: A non-transitory computer-readable medium storing code for wireless communications at a UE, the code comprising instructions executable by a processor to perform a method of any of aspects 1 through 22.

Aspect 32: An apparatus for wireless communications at a base station, comprising a processor and memory coupled with the processor. The processor and memory may be configured to perform a method of any of aspects 23 through 28.

Aspect 33: An apparatus for wireless communications at a base station, comprising at least one means for performing a method of any of aspects 23 through 28.

Aspect 34: A non-transitory computer-readable medium storing code for wireless communications at a base station, the code comprising instructions executable by a processor to perform a method of any of aspects 23 through 28.

Aspect 35: A method for wireless communications at a UE, comprising: receiving, from a base station, DCI indicating a set of allocated resources that the UE is to utilize for tone reservation; identifying, from the set of allocated resources, a first set of tones for transmitting a data signal and a second set of tones for transmitting a peak-reduction signal, the first set of tones being different from the second set of tones; and transmitting the data signal on the first set of tones and the peak-reduction signal on the second set of tones based at least in part on the DCI.

Aspect 36: The method of aspect 35, further comprising: determining the DCI comprises a first DCI and a second DCI, the first DCI indicating the first set of tones and the second DCI indicating the second set of tones; receiving, in a first codeword, the first DCI associated with a first RNTI and receiving, in a second codeword, the second DCI associated with a second RNTI, the first RNTI different from the second RNTI.

Aspect 37: The method of aspect 36, further comprising: determining the second RNTI indicates one or more resources from a set of allocated resources for transmission of the second set of tones; and transmitting a peak-reduction signal on the second set of tones based at least in part on the second RNTI.

Aspect 38: The method of any one of aspects 36 and 37, the first codeword and the first RNTI being different from the second codeword and the second RNTI.

Aspect 39: The method of any one of aspects 36 through 38, further comprising: receiving a message comprising a monitoring configuration for the first RNTI and the second RNTI; and monitoring for the first RNTI or the second RNTI based at least in part on receiving the monitoring configuration.

Aspect 40: The method of aspect 39, the monitoring configuration comprising an RRC message, a RMSI message, or both.

Aspect 41: The method of any one of aspects 35 through 40, further comprising: determining the peak-reduction signal reduces a PAPR value associated with the uplink transmission; identifying a PAPR value that exceeds a threshold PAPR value for an uplink transmission; and receiving, in the DCI, an allocation of the first set of tones that is within a threshold frequency distance from the second set of tones based at least in part on the identified PAPR value.

Aspect 42: The method of aspect 41, further comprising: transmitting, to the base station, a request for a number of tones to be allocated to the second set of tones for transmission of the peak-reduction signal in accordance with a reduced PAPR value; and receiving the DCI based at least in part on the request.

Aspect 43: The method of aspect 42, the request for the number of tones comprising at least portion of a power headroom report.

Aspect 44: The method of any of aspects 35 through 43, further comprising: determining that the second set of tones is common to the UE and one or more other UEs; identifying a proximity relationship between the first set of tones and the second set of tones of the set of allocated resources, a tone reservation capability of the UE being based at least in part on the proximity relationship; and transmitting the data signal and the peak-reduction signal based at least in part on the proximity relationship.

Aspect 45: The method of aspect 44, further comprising: determining the proximity relationship is associated with a difference in frequency between the first set of tones and the second set of tones.

Aspect 46: The method of any one of aspects 35 through 45, further comprising: transmitting, to a base station, an indication of a tone reservation capability for an uplink transmission by the UE; determining the set of allocated resources is scheduled by the DCI in accordance with the tone reservation capability of the UE; and configuring the peak-reduction signal based at least in part on the tone reservation capability.

Aspect 47: The method of aspect 46, the tone reservation capability of the UE comprising a power amplification class, a number of antenna elements, a number of radio frequency chains, a number of multiple-input multiple-output layers, a maximum power reduction value, or any combination thereof.

Aspect 48: The method of any one of aspects 35 through 47, further comprising: determining that the first set of tones for transmitting the data signal at the UE is different from a third set of tones for transmitting a second data signal by a second UE; determining that the second set of tones for transmitting the peak-reduction signal at the UE at least partially overlap with a fourth set of tones for transmitting a second peak reduction-signal by the second UE; and transmitting the peak-reduction signal on the second set of tones based at least in part on a simultaneous transmission by the second UE.

Aspect 49: The method of aspect 48, further comprising: identifying a first RNTI associated the first set of tones for transmitting the data signal at the UE that is different from a second RNTI associated with the third set of tones for transmitting the second data signal by the second UE, the first RNTI and the second RNTI being different from a third RNTI that is common to the second set of tones and the fourth set of tones.

Aspect 50: The method of any one of aspects 48 and 49, further comprising: determining the second set of tones for transmitting the peak-reduction signal at least partially overlap with the third set of tones for transmitting the second data signal, the fourth set of tones for transmitting the second peak-reduction signal, or both; and transmitting the peak-reduction signal based at least in part on the overlap.

Aspect 51: The method of any one of aspects 48 through 50, further comprising: transmitting the first set of tones on a first beam of the set of allocated resources; and transmitting the second set of tones on a second beam of the set of allocated resources.

Aspect 52: The method of any one of aspects 35 through 51, further comprising: determining that the DCI indicates whether the second set of tones are allocated for transmission of the peak-reduction signal; identifying a number of the second set of tones based at least in part on a function of the set of allocated resources; and transmitting the peak-reduction signal on the second set of tones allocated by the DCI.

Aspect 53: The method of aspect 52, further comprising: refraining from monitoring an RNTI associated with the second set of tones based at least in part on a determination that the second set of tones are not allocated for transmission of the peak-reduction signal.

Aspect 54: The method of any one of aspects 52 and 53, the function of the set of allocated resources comprising a fraction of the set of allocated resources, a fraction of a total number of tones, or both.

Aspect 55: The method of any one of aspects 52 through 54, further comprising: receiving a control message that comprises a configuration for the second set of tones.

Aspect 56: A method for wireless communications at a base station, comprising: determining a set of allocated resources that a UE is to utilize for tone reservation, the set of allocated resources comprising a first set of tones for transmission of a data signal and a second set of tones for transmission of a peak-reduction signal, the first set of tones being different from the second set of tones; transmitting DCI indicating the set of allocated resources; and receiving, from the UE, the data signal on the first set of tones and the peak-reduction signal on the second set of tones based at least in part on the DCI.

Aspect 57: The method of aspect 56, further comprising: determining the DCI comprises a first DCI and a second DCI, the first DCI indicating the first set of tones and the second DCI indicating the second set of tones; transmitting the first DCI in a first codeword associated with a first RNTI; and transmitting the second DCI in a second codeword associated with a second RNTI, the first RNTI different from the second RNTI.

Aspect 58: The method of aspect 57, further comprising: determining the second RNTI indicates one or more resources from a set of allocated resources for transmission of the second set of tones; and receiving a peak-reduction signal on the second set of tones based at least in part on the second RNTI.

Aspect 59: The method of any one of aspects 57 and 58, the first codeword and the first RNTI being different from the second codeword and the second RNTI.

Aspect 60: The method of any one of aspects 57 through 59, further comprising: transmitting a message comprising a monitoring configuration for the first RNTI and the second RNTI; and monitoring for the first RNTI or the second RNTI based at least in part on receiving the monitoring configuration.

Aspect 61: The method of any one of aspects 57 through 60, the monitoring configuration comprising an RRC message, a RMSI message, or both.

Aspect 62: The method of any one of aspects 56 through 61 further comprising: determining the peak-reduction signal reduces a PAPR value associated with the uplink transmission; identifying a PAPR value for the UE that exceeds a threshold PAPR value for an uplink transmission; allocating the first set of tones to be within a threshold frequency distance from the second set of tones based at least in part on the identified PAPR value; and transmitting the DCI with the allocation of the first set of tones and the second set of tones.

Aspect 63: The method of aspect 62, further comprising: receiving, from the UE, a request for a number of tones to be allocated to the second set of tones for transmission of the peak-reduction signal in accordance with a reduced PAPR value; and transmitting the DCI based at least in part on the request.

Aspect 64: The method of aspect 63, the request for the number of tones comprising at least portion of a power headroom report.

Aspect 65: The method of any one of aspects 56 through 64, further comprising: determining that the second set of tones is common to the UE and one or more other UEs; identifying a proximity relationship between the first set of tones and the second set of tones of the set of allocated resources, a tone reservation capability of the UE being based at least in part on the proximity relationship; and receiving the data signal and the peak-reduction signal based at least in part on the proximity relationship.

Aspect 66: The method of aspect 65, further comprising: determining the proximity relationship is associated with a difference in frequency between the first set of tones and the second set of tones.

Aspect 67: The method of any one of aspects 56 through 66, further comprising: receiving, from the UE, an indication of a tone reservation capability for an uplink transmission by the UE; determining the configuration of the DCI based at least in part on the tone reservation capability of the UE; and receiving the peak-reduction signal based at least in part on the tone reservation capability.

Aspect 68: The method of aspect 67, the tone reservation capability of the UE comprising a power amplification class, a number of antenna elements, a number of radio frequency chains, a number of multiple-input multiple-output layers, a maximum power reduction value, or any combination thereof.

Aspect 69: The method of any one of aspects 56 through 68, further comprising: determining that the first set of tones for transmission of the data signal from the UE is different from a third set of tones for transmission of a second data signal from a second UE; determining that the second set of tones for transmission of the peak-reduction signal at the UE at least partially overlap with a fourth set of tones for transmission of a second peak reduction-signal by the second UE; and receiving the peak-reduction signal on the second set of tones based at least in part on a simultaneous transmission by the first UE and the second UE.

Aspect 70: The method of aspect 69, further comprising: identifying a first RNTI associated the first set of tones for transmitting the data signal at the UE that is different from a second RNTI associated with the third set of tones for transmitting the second data signal by the second UE, the first RNTI and the second RNTI being different from a third RNTI that is common to the second set of tones and the fourth set of tones.

Aspect 71: The method of any one of aspects 69 and 70, further comprising: determining the second set of tones for transmission of the peak-reduction signal at least partially overlap with the third set of tones for transmission of the second data signal, the fourth set of tones for transmission of the second peak-reduction signal, or both; and receiving the peak-reduction signal based at least in part on the overlap.

Aspect 72: The method of any one of aspects 69 through 71, further comprising: receiving the first set of tones on a first beam of the set of allocated resources; and receiving the second set of tones on a second beam of the set of allocated resources.

Aspect 73: The method of any one of aspects 56 through 72, further comprising: identifying a number of the second set of tones to allocate for transmission of the peak-reduction signal based at least in part on a function of the set of allocated resources; transmitting the DCI to allocate the second set of tones for transmission of the peak-reduction signal; and receiving the peak-reduction signal on the second set of tones allocated by the DCI.

Aspect 74: The method of aspect 73, further comprising: transmitting, to the UE, an indication that the second set of tones are not allocated for transmission of the peak-reduction signal; determining that the UE is to refrain from monitoring an RNTI associated with the second set of tones based at least in part on the indication that the second set of tones are not allocated.

Aspect 75: The method of any one of aspects 73 and 74, the function of the set of allocated resources comprising a fraction of the set of allocated resources, a fraction of a total number of tones, or both.

Aspect 76: The method of any one of aspects 73 through 75, further comprising: transmitting a control message that comprises a configuration for the second set of tones.

Aspect 77: An apparatus for wireless communication comprising at least one means for performing a method of any one of aspects 35 through 55.

Aspect 78: An apparatus for wireless communication comprising a processor and memory coupled to the processor, the processor and memory configured to perform a method of any one of aspects 35 through 55.

Aspect 45: A non-transitory computer-readable medium storing code for wireless communication, the code comprising instructions executable by a processor to perform a method of any one of aspects 35 through 55.

Aspect 46: An apparatus for wireless communication comprising at least one means for performing a method of any one of aspects 56 through 76.

Aspect 47: An apparatus for wireless communication comprising a processor and memory coupled to the processor, the processor and memory configured to perform a method of any one of aspects 56 through 76.

Aspect 48: A non-transitory computer-readable medium storing code for wireless communication, the code comprising instructions executable by a processor to perform a method of any one of aspects 56 through 76.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more memories; and
   one or more processors coupled to the one or more memories, the one or more processors configured to cause the UE to:
      receive downlink control information (DCI) that indicates a set of allocated resources the UE is to utilize for tone reservation, wherein the DCI comprises a first DCI and a second DCI, wherein the first DCI is indicative of a first set of data tones and the second DCI is indicative of a first set of peak-reduction tones; and
      transmit a signal comprising a combination of the first set of data tones and the first set of peak-reduction tones from the set of allocated resources based at least in part on the DCI, wherein the first set of data tones is different from the first set of peak-reduction tones.

2. The apparatus of claim 1, wherein the one or more processors are further configured to cause the UE to:
receive, in a first codeword, the first DCI associated with a first radio network temporary identifier (RNTI); and
receive, in a second codeword, the second DCI associated with a second RNTI, the first RNTI different from the second RNTI.

3. The apparatus of claim 2, wherein the one or more processors are further configured to cause the UE to:
determine the second RNTI indicates one or more resources from the set of allocated resources for transmission of the first set of peak-reduction tones; and
transmit a peak-reduction signal on the first set of peak-reduction tones based at least in part on the second RNTI.

4. The apparatus of claim 2, wherein the first codeword and the first RNTI is different from the second codeword and the second RNTI.

5. The apparatus of claim 2, wherein the one or more processors are further configured to cause the UE to:
receive a message comprising a configuration to monitor for the first RNTI and the second RNTI; and
monitor for the first RNTI or the second RNTI based at least in part on the configuration.

6. The apparatus of claim 5, wherein the configuration comprises a radio resource control (RRC) message, a remaining minimum system information (RMSI) message, or both.

7. The apparatus of claim 1, wherein the one or more processors are further configured to cause the UE to:
determine the signal comprises a peak-reduction signal that reduces a peak to average power ratio (PAPR) value associated with an uplink transmission;
identify a PAPR value that exceeds a threshold PAPR value for the uplink transmission; and
receive, in the first DCI, an allocation of the first set of data tones that is within a threshold frequency distance from the first set of peak-reduction tones based at least in part on the identified PAPR value.

8. The apparatus of claim 7, wherein the one or more processors are further configured to cause the UE to:
transmit a request for a quantity of tones to be allocated to the first set of peak-reduction tones for transmission of the peak-reduction signal in accordance with a reduced PAPR value; and
receive the second DCI based at least in part on the request.

9. The apparatus of claim 8, wherein the request for the quantity of tones comprises at least a portion of a power headroom report.

10. The apparatus of claim 1, wherein the one or more processors are further configured to cause the UE to:
determine that the first set of peak-reduction tones is common to the UE and one or more other UEs;
identify a proximity relationship between the first set of data tones and the first set of peak-reduction tones, wherein a tone reservation capability of the UE is based at least in part on the proximity relationship; and
transmit the signal based at least in part on the proximity relationship.

11. The apparatus of claim 10, wherein the one or more processors are configured to cause the UE to:
determine the proximity relationship is associated with a difference in frequency between the first set of data tones and the first set of peak-reduction tones.

12. The apparatus of claim 1, wherein the one or more processors are further configured to cause the UE to:
transmit an indication of a tone reservation capability for an uplink transmission by the UE;
determine the set of allocated resources is scheduled by the DCI in accordance with the tone reservation capability of the UE; and
configure the signal based at least in part on the tone reservation capability.

13. The apparatus of claim 12, wherein the tone reservation capability of the UE comprises a power amplification class, a quantity of antenna elements, a quantity of radio frequency chains, a quantity of multiple-input multiple-output layers, a maximum power reduction value, or any combination thereof.

14. The apparatus of claim 1, wherein the one or more processors are further configured to cause the UE to:
determine that the first set of data tones to transmit a data signal at the UE is different from a second set of data tones to transmit a second data signal by a second UE;
determine that the first set of peak-reduction tones associated with a first peak-reduction signal at the UE at least partially overlaps with a second set of peak-reduction tones associated with a second peak-reduction signal; and
transmit the first peak-reduction signal on the first set of peak-reduction tones based at least in part on a simultaneous transmission by the second UE.

15. The apparatus of claim 14, wherein the one or more processors are further configured to cause the UE to:
identify a first RNTI associated with the first set of data tones associated with the data signal at the UE that is different from a second RNTI associated with the second set of data tones associated with the second data signal, wherein the first RNTI and the second RNTI are different from a third RNTI that is common to the first set of peak-reduction tones and the second set of peak-reduction tones.

16. The apparatus of claim 14, wherein the one or more processors are further configured to cause the UE to:
determine the first set of peak-reduction tones associated with the first peak-reduction signal at least partially overlaps with the second set of data tones associated with the second data signal, wherein the second set of peak-reduction tones is associated with the second peak-reduction signal; and
transmit the first peak-reduction signal based at least in part on the overlap.

17. The apparatus of claim 14, wherein the one or more processors are further configured to cause the UE to:
transmit the first set of data tones on a first beam of the set of allocated resources; and
transmit the first set of peak-reduction tones on a second beam of the set of allocated resources.

18. The apparatus of claim 14, wherein the one or more processors are further configured to cause the UE to:
determine that the second DCI indicates whether the first set of peak-reduction tones are allocated for transmission of the first peak-reduction signal;
identify a quantity of the first set of peak-reduction tones based at least in part on a function of the set of allocated resources; and
transmit the first peak-reduction signal on the first set of peak-reduction tones allocated by the second DCI.

19. The apparatus of claim 18, wherein the one or more processors are further configured to cause the UE to:
refrain from monitoring an RNTI associated with the first set of peak-reduction tones based at least in part on a determination that the first set of peak-reduction tones are not allocated for transmission of the first peak-reduction signal.

20. The apparatus of claim 18, wherein the function of the set of allocated resources comprises a fraction of the set of allocated resources, a fraction of a total quantity of tones, or both.

21. The apparatus of claim 18, wherein the one or more processors are further configured to cause the UE to:
receive a control message that comprises a configuration for the first set of peak-reduction tones.

22. An apparatus for wireless communications at a network device, comprising:
one or more memories; and
one or more processors coupled to the one or more memories, the one or more processors configured to cause the network device to:
transmit downlink control information (DCI) that indicates a set of allocated resources a user equipment (UE) is to utilize for tone reservation, the set of allocated resources comprising a first set of data tones and a first set of peak-reduction tones for transmission of a signal, wherein the first set of peak-reduction tones is different from the first set of data tones, and wherein the DCI comprises a first DCI and a second DCI, wherein the first DCI is indicative of the first set of data tones and the second DCI is indicative of the first set of peak-reduction tones; and
receive the signal comprising a combination of the first set of data tones and the first set of peak-reduction tones based at least in part on the DCI.

23. The apparatus of claim 22, wherein the one or more processors are further configured to cause the network device to:
transmit the first DCI in a first codeword associated with a first radio network temporary identifier (RNTI); and
transmit the second DCI in a second codeword associated with a second RNTI, the first RNTI different from the second RNTI.

24. The apparatus of claim 23, wherein the one or more processors are further configured to cause the network device to:
determine the second RNTI indicates one or more resources from the set of allocated resources for transmission of the first set of peak-reduction tones; and
receive the signal on the first set of peak-reduction tones based at least in part on the second RNTI.

25. The apparatus of claim 23, wherein the first codeword and the first RNTI is different from the second codeword and the second RNTI.

26. The apparatus of claim 23, wherein the one or more processors are further configured to cause the network device to:
transmit a message comprising a configuration to monitor for the first RNTI and the second RNTI; and
monitor for the first RNTI or the second RNTI based at least in part on the configuration.

27. A method for wireless communications at a user equipment (UE), comprising:
receiving, downlink control information (DCI) that indicates a set of allocated resources the UE is to utilize for tone reservation, wherein the DCI comprises a first DCI and a second DCI, wherein the first DCI is indicative of a first set of data tones and the second DCI is indicative of a first set of peak-reduction tones; and
transmitting a signal comprising a combination of the first set of data tones and the first set of peak-reduction tones from the set of allocated resources based at least in part on the DCI, wherein the first set of data tones is different from the first set of peak-reduction tones.

28. The method of claim 27, further comprising:
receiving, in a first codeword, the first DCI associated with a first radio network temporary identifier (RNTI); and
receiving, in a second codeword, the second DCI associated with a second RNTI, the first RNTI different from the second RNTI.

29. The method of claim 28, further comprising:
determining the second RNTI indicates one or more resources from the set of allocated resources for transmission of the first set of peak-reduction tones; and
transmitting a peak-reduction signal on the first set of peak-reduction tones based at least in part on the second RNTI.

30. The method of claim 28, wherein the first codeword and the first RNTI are different from the second codeword and the second RNTI.

31. The method of claim 28, further comprising:
receiving a message comprising a configuration to monitor for the first RNTI and the second RNTI; and
monitoring for the first RNTI or the second RNTI based at least in part on the configuration.

32. A method for wireless communications at a network device, comprising:
transmitting downlink control information (DCI) that indicates a set of allocated resources that a user equipment (UE) is to utilize for tone reservation, the set of allocated resources comprising a first set of data tones and a first set of peak-reduction tones for transmission of a signal, the first set of peak-reduction tones is different from the first set of data tones, and wherein the DCI comprises a first DCI and a second DCI, wherein the first DCI is indicative of the first set of data tones and the second DCI is indicative of the first set of peak-reduction tones; and
receiving the signal comprising a combination of the first set of data tones and the first set of peak-reduction tones based at least in part on the DCI.

33. The method of claim 32, the method further comprising:
transmitting the first DCI in a first codeword associated with a first radio network temporary identifier (RNTI); and
transmitting the second DCI in a second codeword associated with a second RNTI, the first RNTI different from the second RNTI.

34. The method of claim 33, further comprising:
determining the second RNTI indicates one or more resources from the set of allocated resources for transmission of the first set of peak-reduction tones; and
receiving a peak-reduction signal on the first set of peak-reduction tones based at least in part on the second RNTI.

35. The method of claim 33, wherein the first codeword and the first RNTI that is different from the second codeword and the second RNTI.

36. The method of claim 33, further comprising:
transmitting a message comprising a configuration for the UE to monitor for the first RNTI and the second RNTI; and
monitoring for the first RNTI or the second RNTI based at least in part on the configuration.

37. A non-transitory computer-readable medium storing code for wireless communications at a user equipment (UE), the code comprising instructions executable by one or more processors to cause the UE to:
receive downlink control information (DCI) indicating a set of allocated resources the UE is to utilize for tone reservation, wherein the DCI comprises a first DCI and a second DCI, wherein the first DCI is indicative of a first set of data tones and the second DCI is indicative of a first set of peak-reduction tones; and
transmit a signal comprising a combination of the first set of data tones and the first set of peak-reduction tones from the set of allocated resources based at least in part on the DCI, wherein the first set of data tones is different from the first set of peak-reduction tones.

38. The non-transitory computer-readable medium of claim 37, wherein the instructions are further executable by the one or more processors to cause the UE to:
receive, in a first codeword, the first DCI associated with a first radio network temporary identifier (RNTI); and
receive, in a second codeword, the second DCI associated with a second RNTI, the first RNTI different from the second RNTI.

39. The non-transitory computer-readable medium of claim 38, wherein the instructions are further executable by the one or more processors to cause the UE to:
determine the second RNTI indicates one or more resources from the set of allocated resources for transmission of the first set of peak-reduction tones; and
transmit a peak-reduction signal on the first set of peak-reduction tones based at least in part on the second RNTI.

40. The non-transitory computer-readable medium of claim 38, wherein the first codeword and the first RNTI are different from the second codeword and the second RNTI.

41. The non-transitory computer-readable medium of claim 38, wherein the instructions are further executable by the one or more processors to cause the UE to:
receive a message comprising a configuration to monitor for the first RNTI and the second RNTI; and
monitor for the first RNTI or the second RNTI based at least in part on the configuration.

42. A non-transitory computer-readable medium storing code for wireless communications at a network device, the code comprising instructions executable by one or more processors to cause the network device to:
transmit downlink control information (DCI) that indicates a set of allocated resources a user equipment (UE) is to utilize for tone reservation, the set of allocated resources comprising a first set of data tones and a first set of peak-reduction tones for transmission of a signal, wherein the first set of peak-reduction tones is different from the first set of data tones, and wherein the DCI comprises a first DCI and a second DCI, wherein the first DCI is indicative of the first set of data tones and the second DCI is indicative of the first set of peak-reduction tones; and
receive the signal comprising a combination of the first set of data tones and the first set of peak-reduction tones based at least in part on the DCI.

43. The non-transitory computer-readable medium of claim 42, wherein the instructions are further executable by the one or more processors to cause the network device to:
transmit the first DCI in a first codeword associated with a first radio network temporary identifier (RNTI); and
transmit the second DCI in a second codeword associated with a second RNTI, the first RNTI different from the second RNTI.

44. The non-transitory computer-readable medium of claim 43, wherein the instructions are further executable by the one or more processors to cause the network device to:
determine the second RNTI indicates one or more resources from the set of allocated resources for transmission of the first set of peak-reduction tones; and
receive a peak-reduction signal on the first set of peak-reduction tones based at least in part on the second RNTI.

45. The non-transitory computer-readable medium of claim 43, wherein the first codeword and the first RNTI are different from the second codeword and the second RNTI.

46. The non-transitory computer-readable medium of claim 43, wherein the instructions are further executable by the one or more processors to cause the network device to:
transmit a message comprising a configuration to monitor for the first RNTI and the second RNTI; and
monitor for the first RNTI or the second RNTI based at least in part on the configuration.

* * * * *